Sept. 17, 1968 J. L. MASSEY 3,402,393

ERROR DETECTION AND CORRECTION IN SIGNAL TRANSMISSION BY USE OF CONVOLUTION CODES

Filed Aug. 2, 1963 18 Sheets-Sheet 11

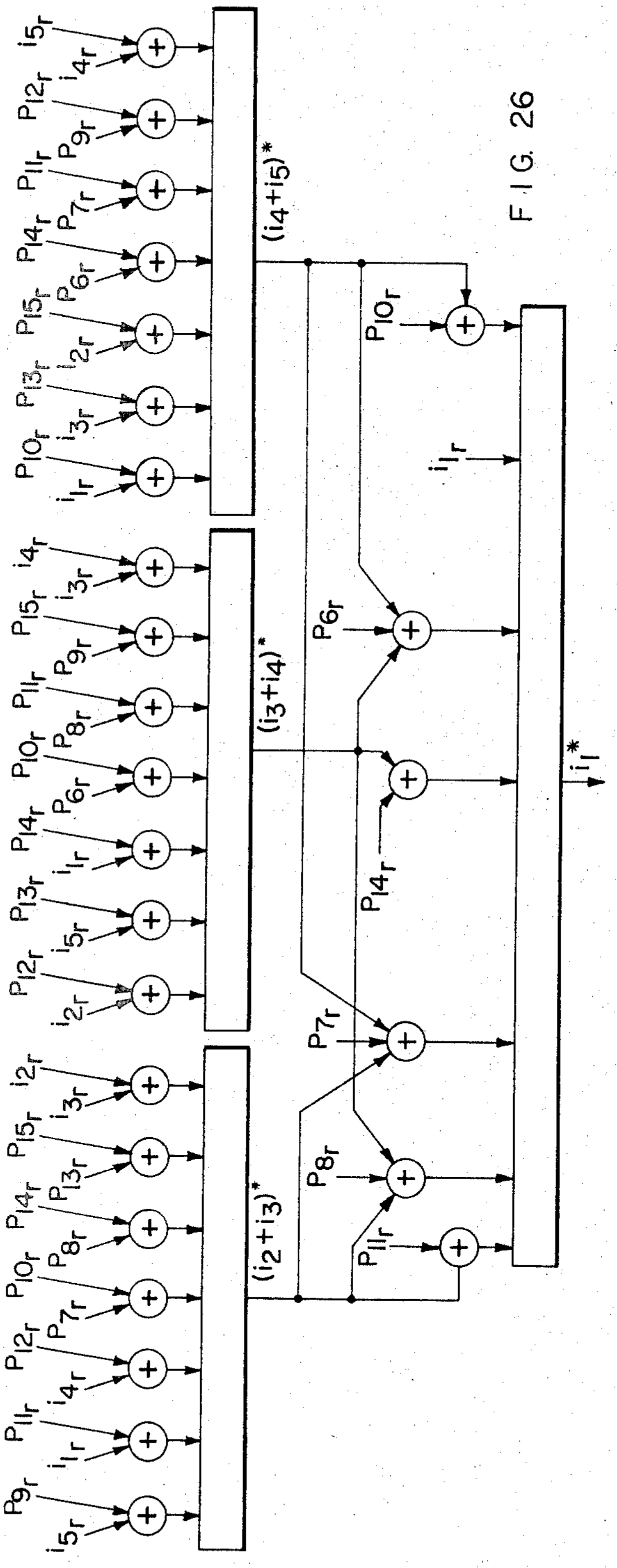
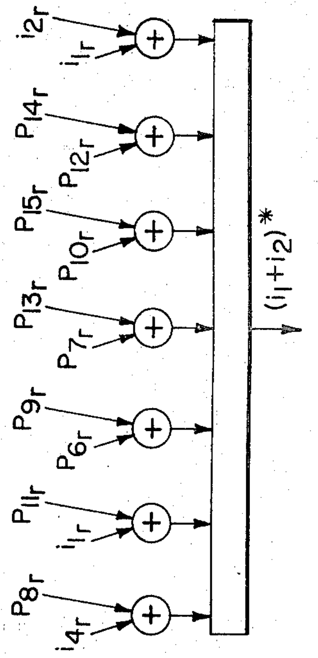
FIG. 27
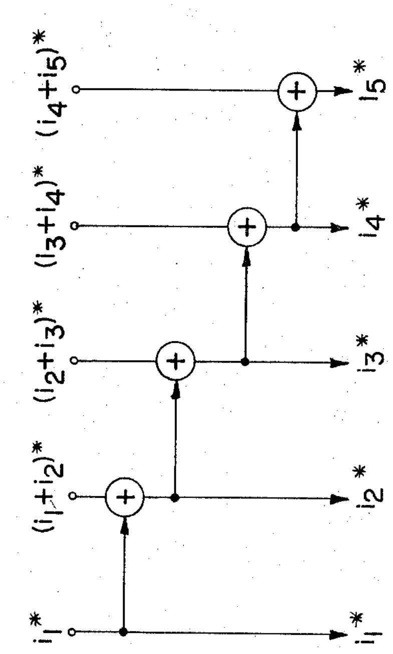
FIG. 28

Sept. 17, 1968 J. L. MASSEY 3,402,393

ERROR DETECTION AND CORRECTION IN SIGNAL TRANSMISSION BY USE OF CONVOLUTION CODES

Filed Aug. 2, 1963 18 Sheets-Sheet 18

United States Patent Office 3,402,393

Patented Sept. 17, 1968

3,402,393

ERROR DETECTION AND CORRECTION IN SIGNAL TRANSMISSION BY USE OF CONVOLUTION CODES

James Lee Massey, South Bend, Ind., assignor to Codex Corporation, Cambridge, Mass., a corporation of Delaware Continuation-in-part of application Ser. No. 212,312, July 25, 1962. This application Aug. 2, 1963, Ser. No. 299,534

12 Claims. (Cl. 340—172.5)

ABSTRACT OF THE DISCLOSURE

Digital error correcting coding techniques involving the sensing of conditions under which the decoder is operating. In one aspect a monitoring device counts the ones in the decoding decision and in certain parity checks corrected by those decisions. In another aspect the code is supplemented such that one actual decoding error can create a number of apparent errors or ones, which enables early detection of conditions beyond the capability of the decoder. In another aspect fades are detected in combination with a decoding logic capable of acting upon the whole set or any group of nonfaded elements in the decoding set.

The present invention relates to apparatus for processing signal infromation, and, more particularly, to the correcting and/or detecting of signal errors or other changes, as produced in transmission. This application is a continuation in part of U.S. application Ser. No. 212,312, filed July 25, 1962, now issued as U.S. Patent 3,303,333, and by this reference incorporated herein.

In signal-transmission systems involving the encoding of signal information, as in binary bits representing "0" or "1" symbols, noise and similar factors, at play during the signal transmission process, may change the signal erroneously to cause the reception of a "1" or a "0" when the actual transmitted signals were "0" or "1" bits, respectively. It is to the solution of the problem of detecting such errors and preferably correcting the same that the present invention is primarily directed; it being an object of the invention to provide new and improved apparatus for such signal processing.

A further object is to provide a new and improved apparatus for detecting (and correcting, in important instances) errors caused by noise and similar factors in successive transmitted information signals.

Another object is to provide novel decoding apparatus of more general utility, as well.

Still another object is to provide a novel apparatus for majority decoding of coded signals, with particular, though not exclusive, emphasis upon convolutional codes.

An additional object is to provide an improved majority decoding apparatus or the like with a novel weighting system.

A further object, still, is to provide a new and improved decoding apparatus embodying a threshold-operated decoder for group codes.

Other and further objects will be explained hereinafter and will be more particularly pointed out in connection with the appended claims.

In summary the invention provides novel coding apparatus employing digital error correcting coding techniques involving the sensing of conditions under which the decoder is operating. In one aspect a monitoring device counts the ones in the decoding decision and in certain parity checks corrected by those decisions. In another aspect the code is supplemented such that one actual decoding error can create a number of apparent errors or ones, which enables early detection of conditions beyond the capability of the decoder. In another aspect fades are detected in combination with a decoding logic capable of acting upon the whole set or any group of nonfaded elements in the decoding set.

The invention will now be described in connection with the accompanying drawing, FIG. 1 of which is a block diagram of a decoder apparatus described in my U.S. Patent 3,303,333.

Figure 4:
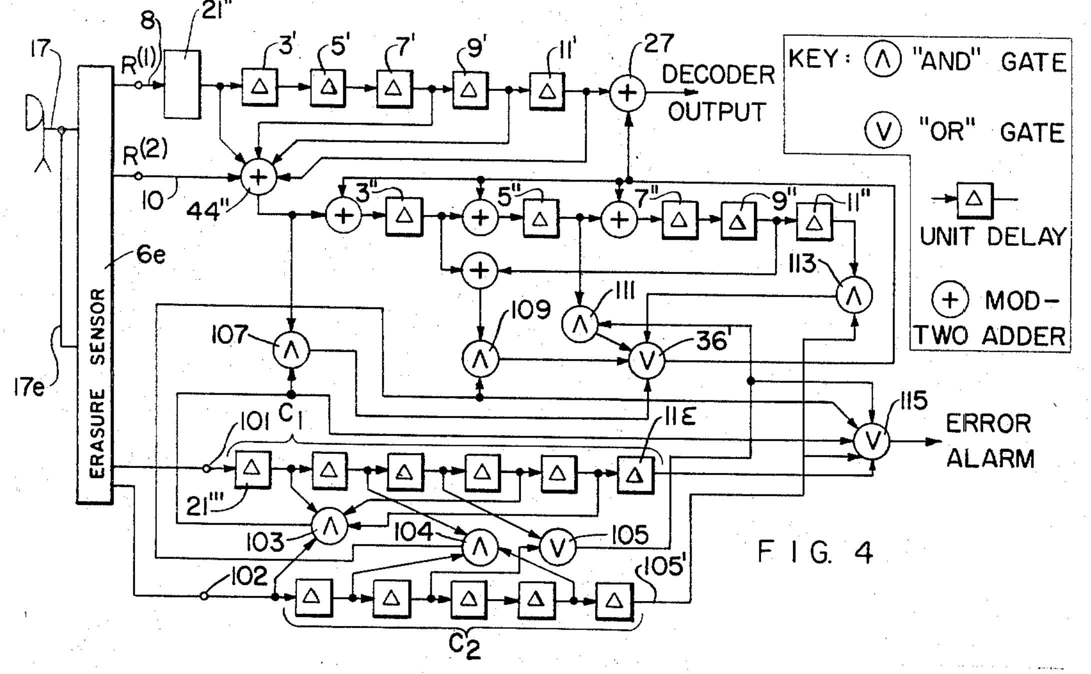
FIG. 4 is a block diagram of a decoder that operates on the binary erasure channel according to the invention.
Figure 4A:
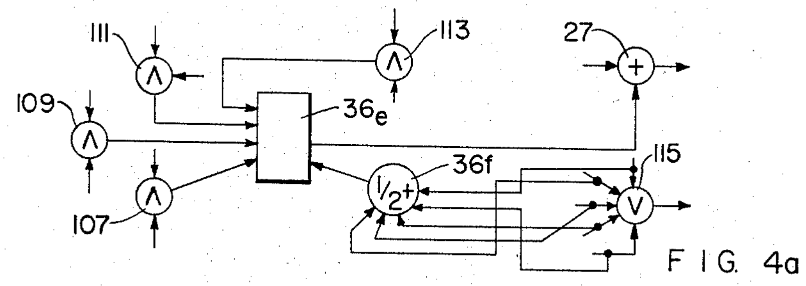
Figure 5:
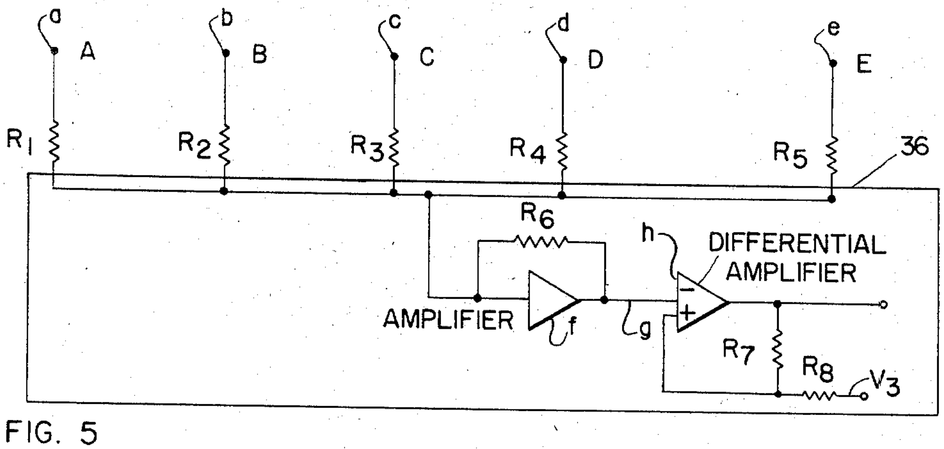
Figure 6:
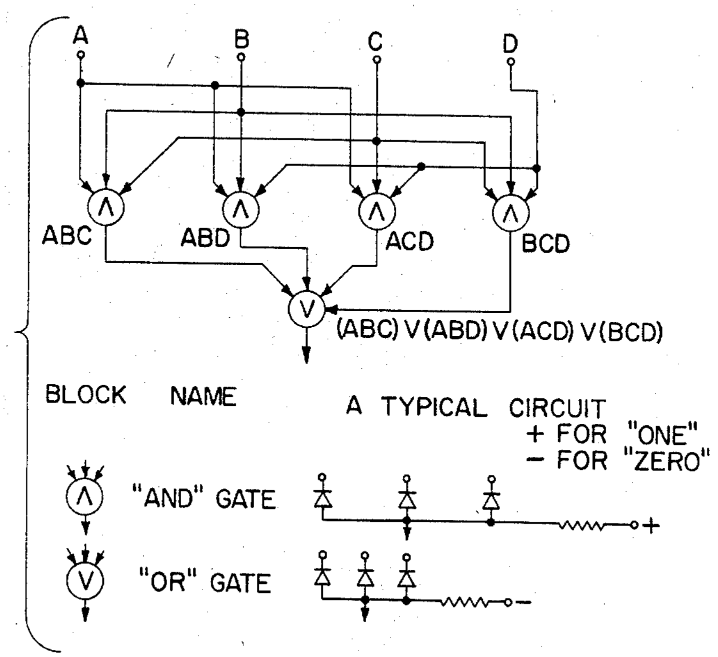
Figure 7:
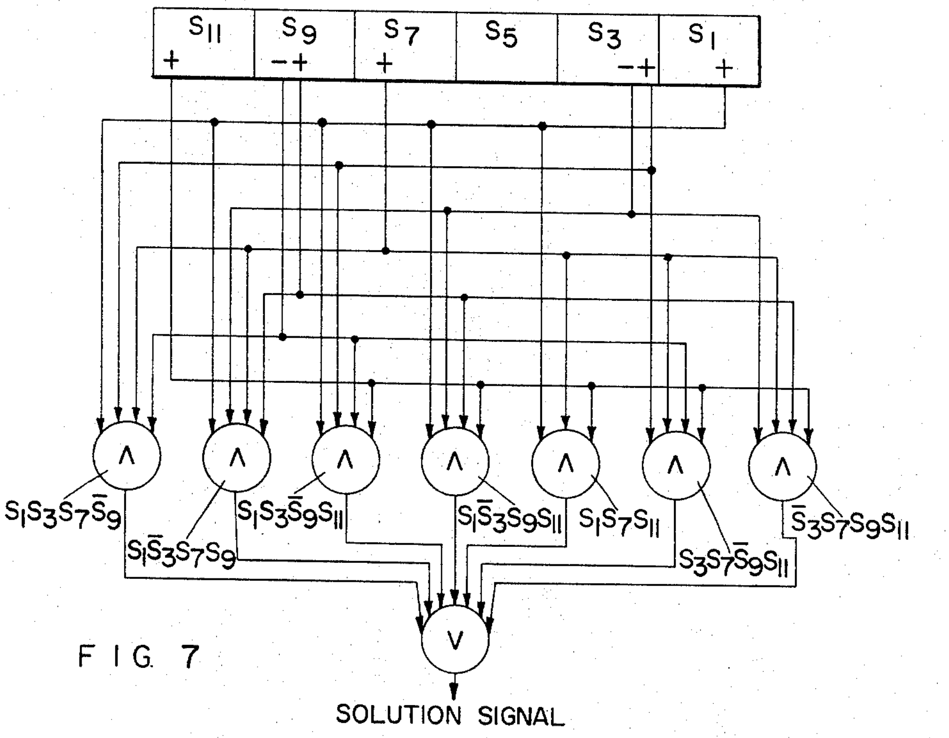
Figure 8:
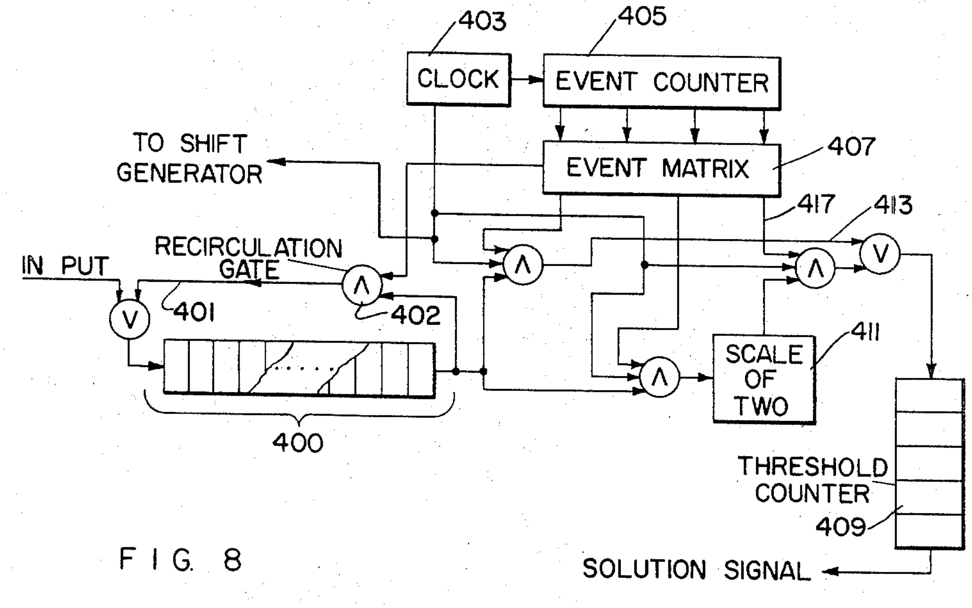
Figure 9:
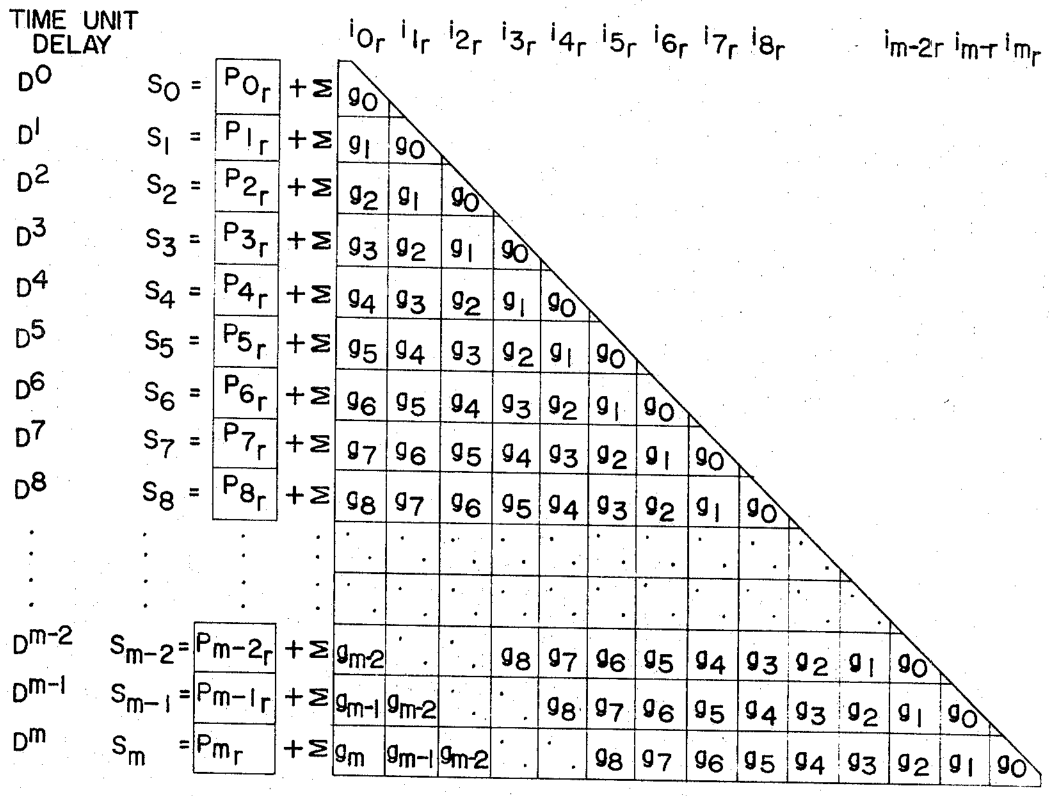
Figure 10:
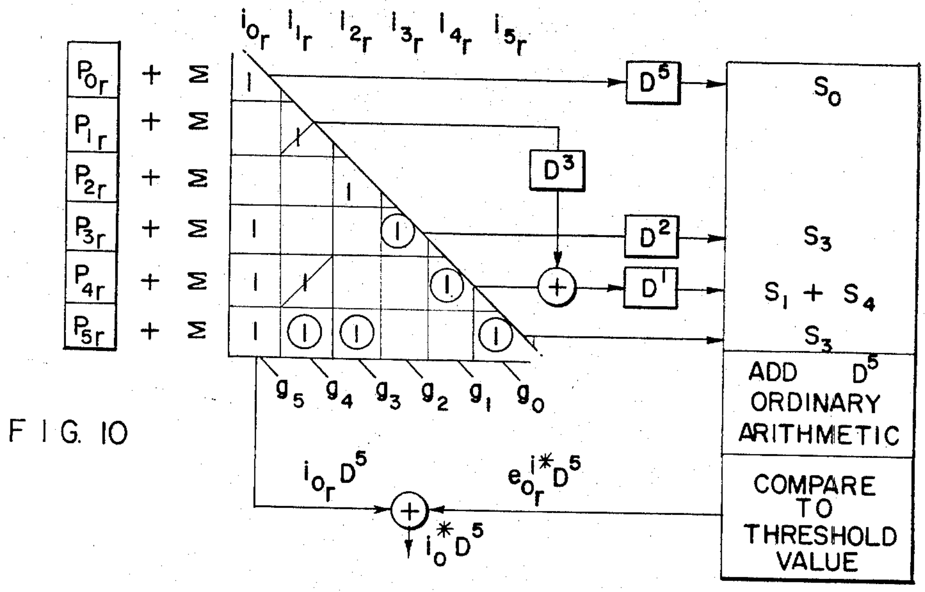
Figure 11:
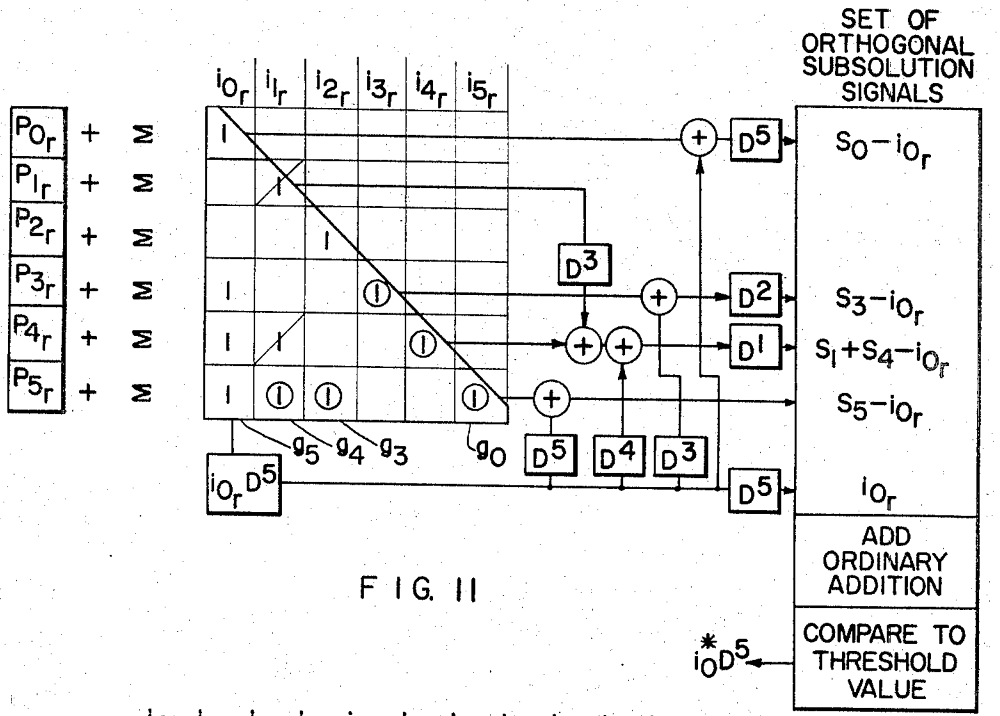
Figure 13:
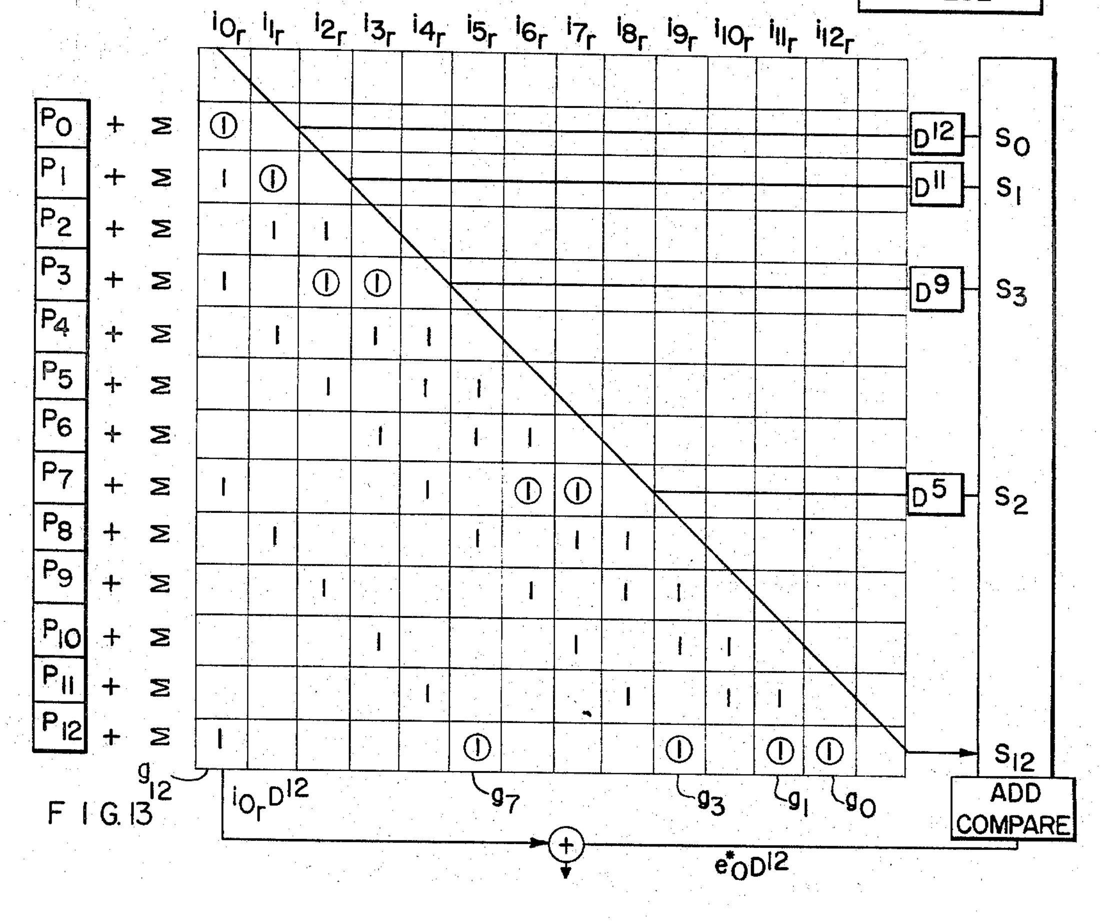
Figure 12:
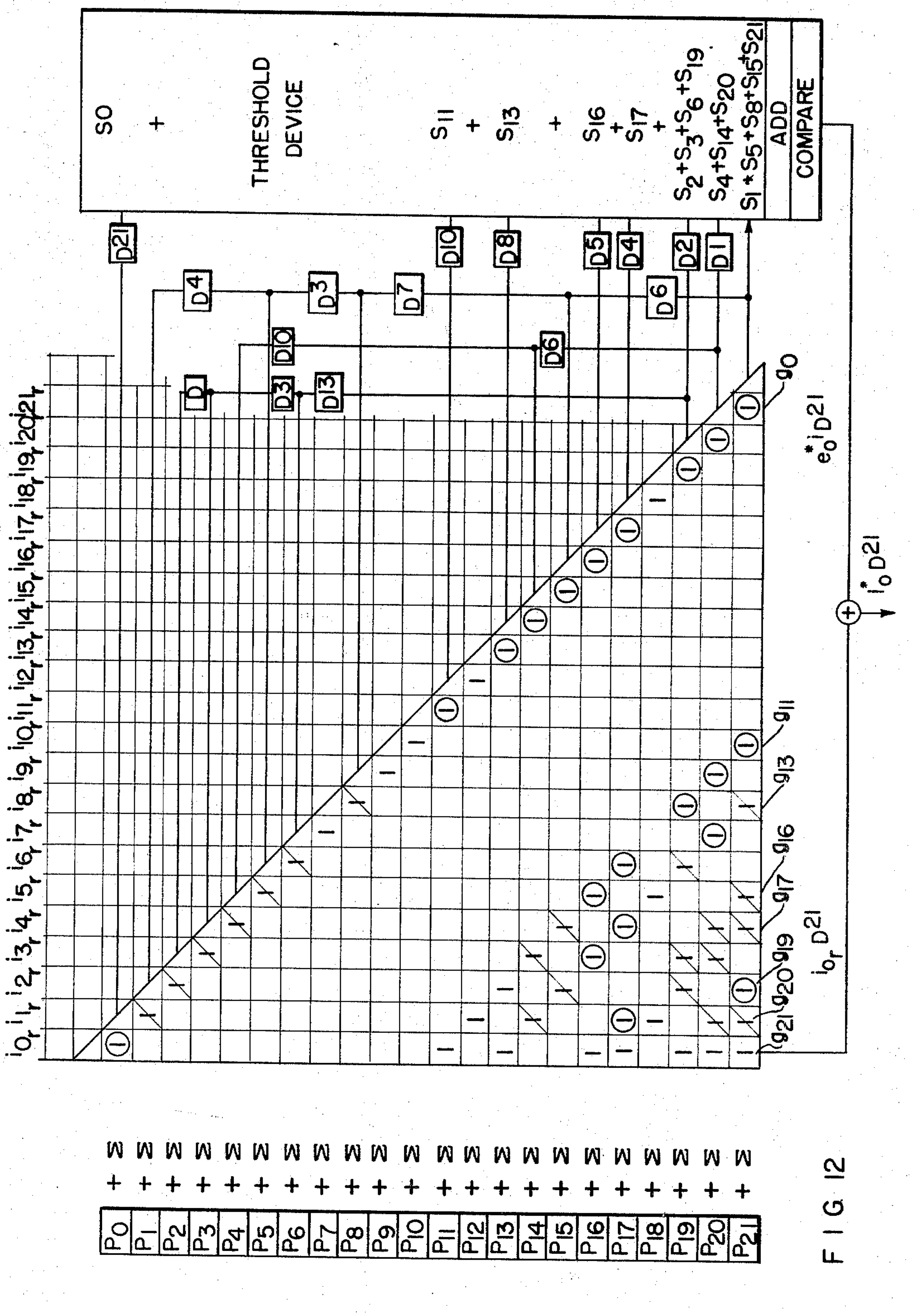
Figure 14:
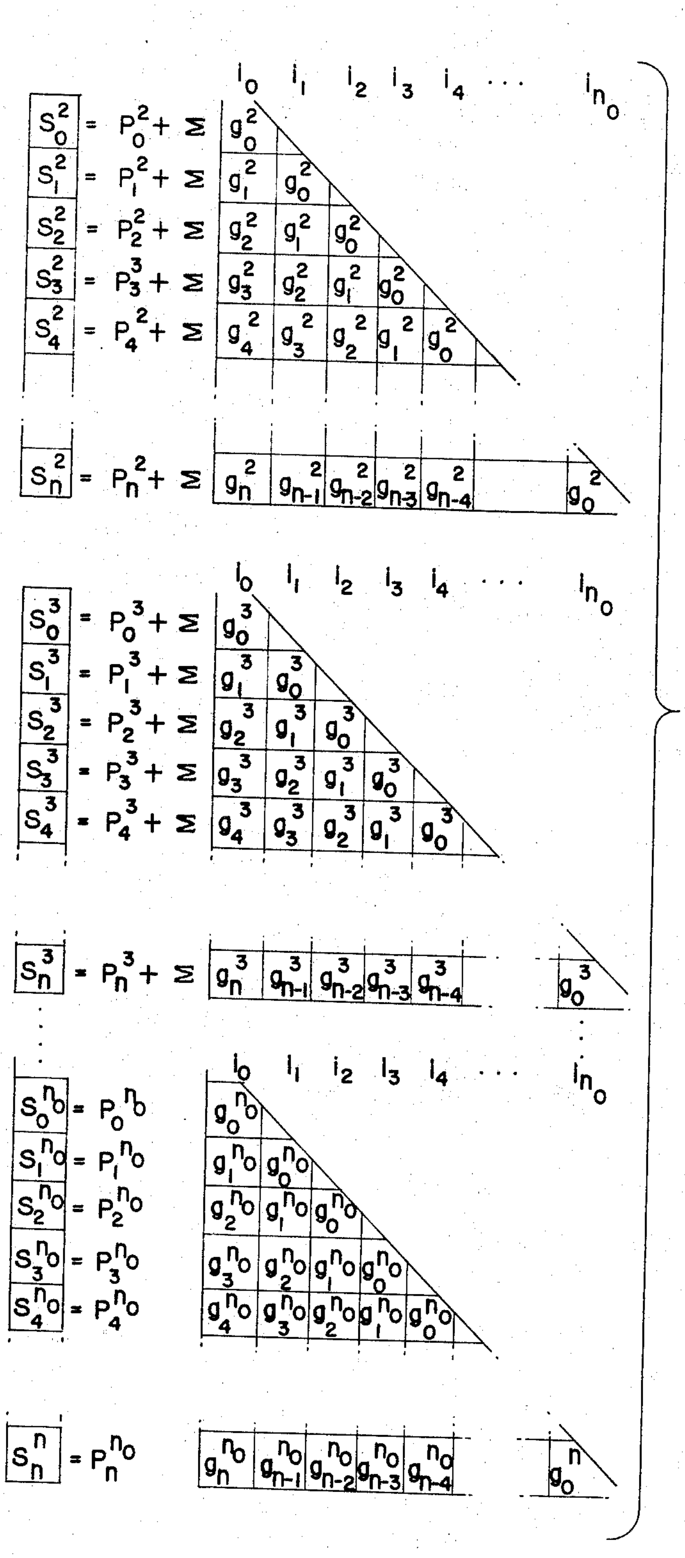
Figure 15:
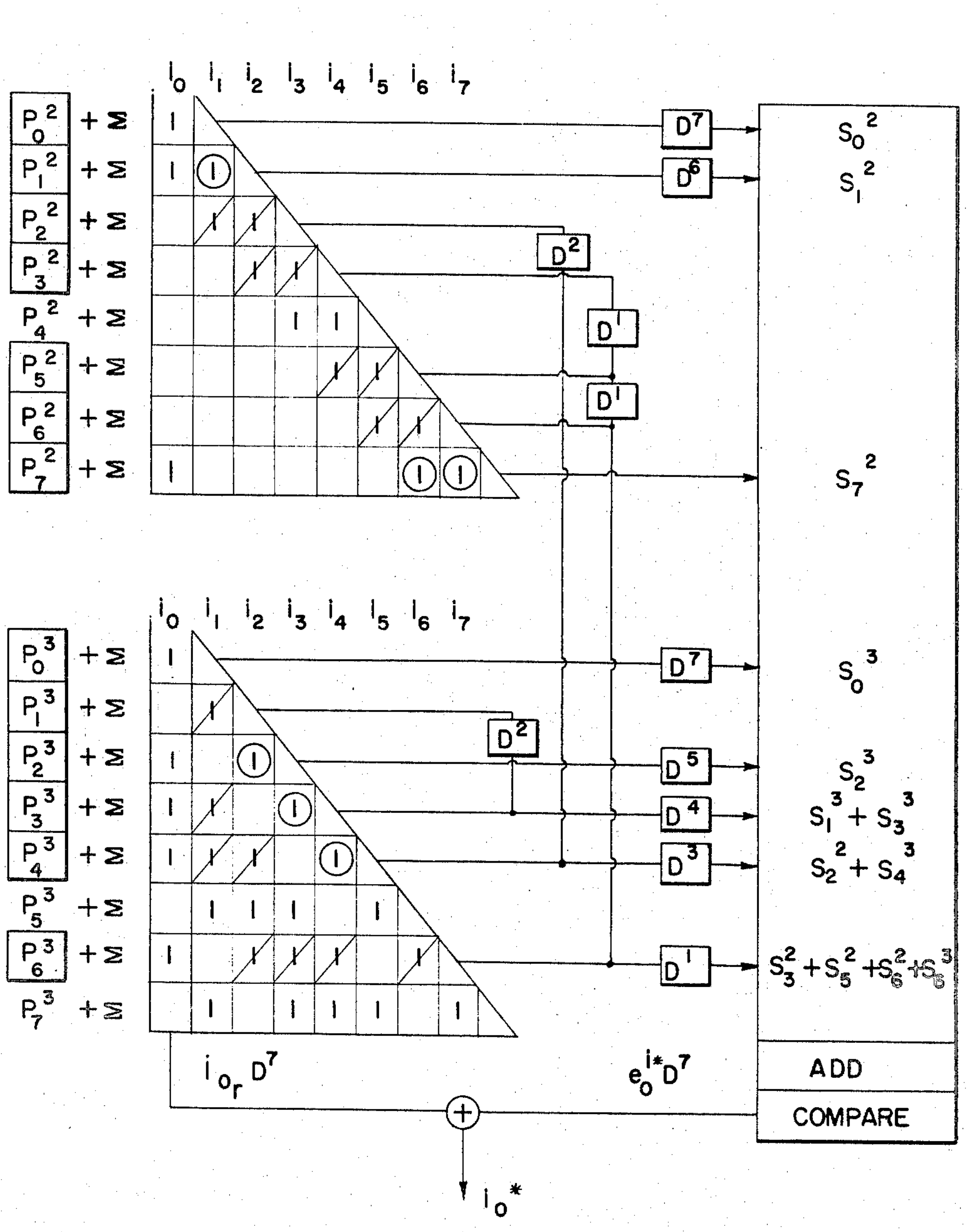
Figure 16:
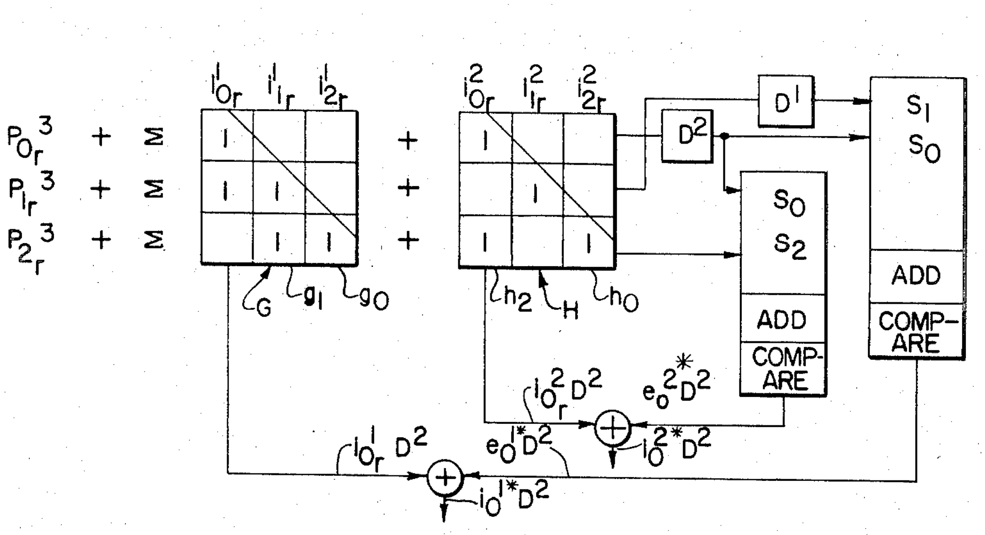
Figure 17:
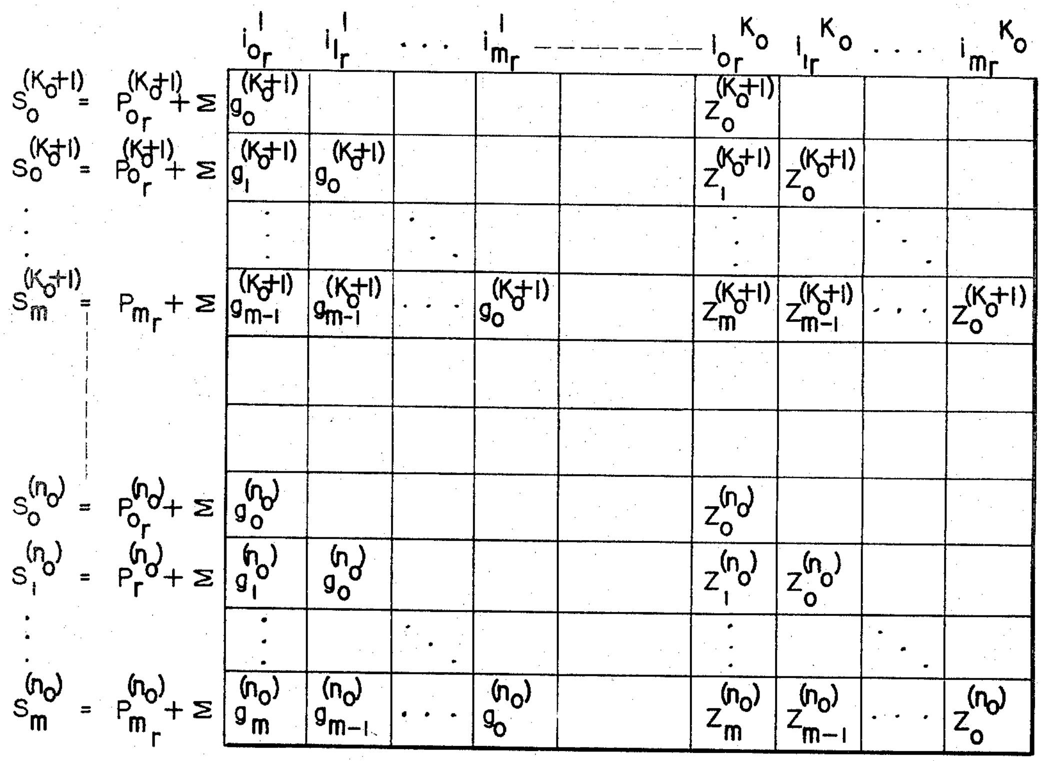
Figure 18:
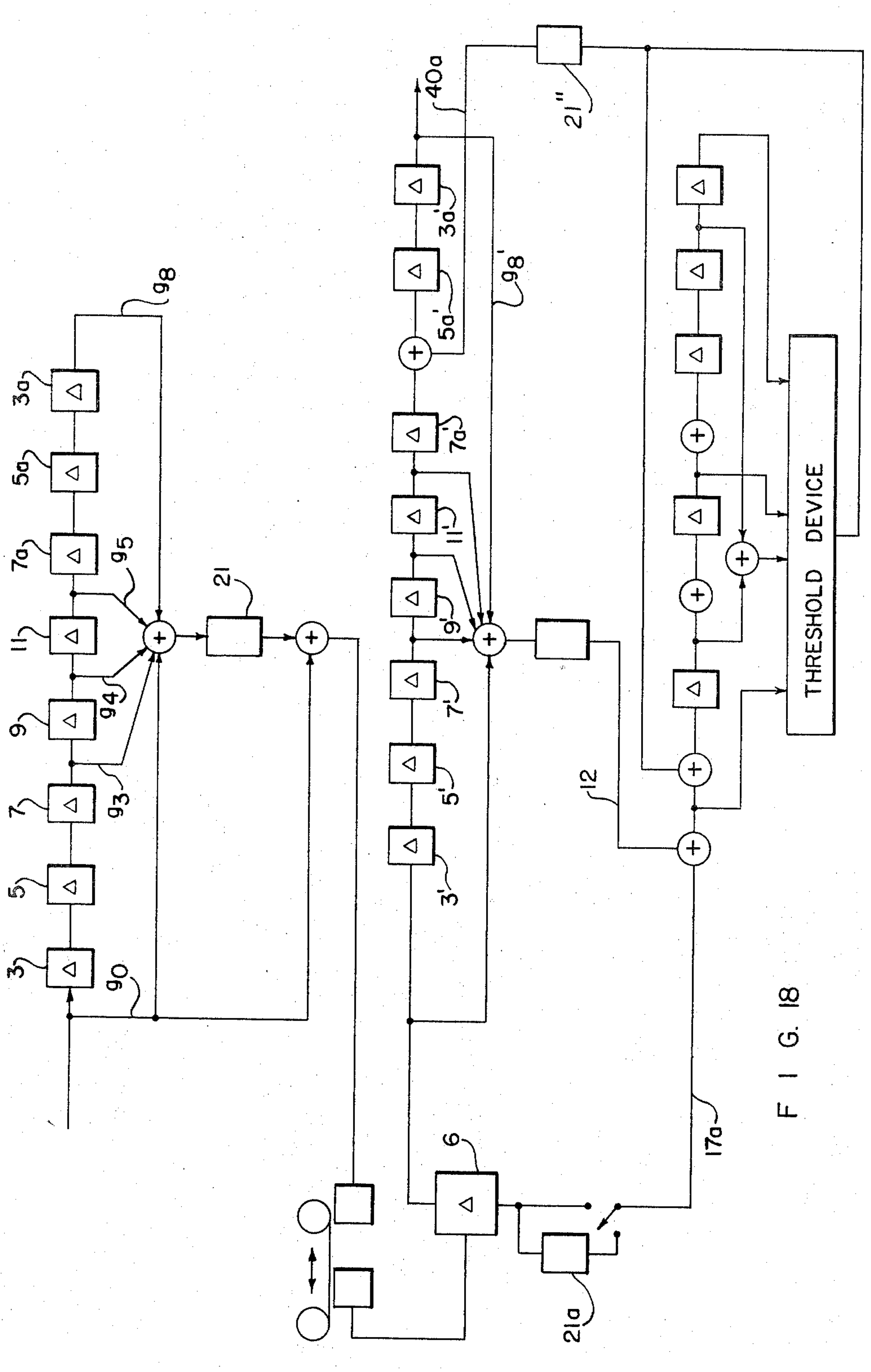
Figure 19:
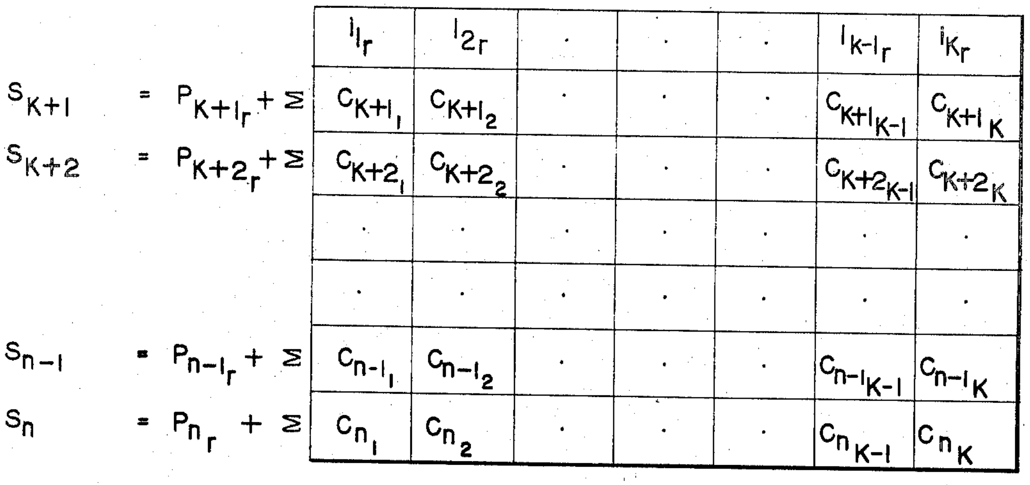
Figure 21:
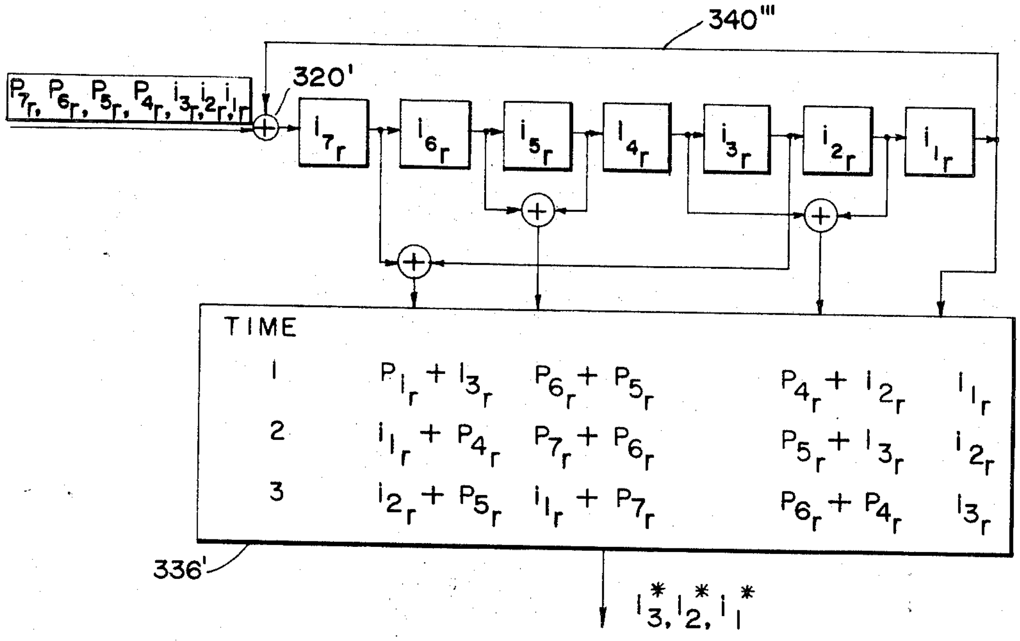
Figure 20:
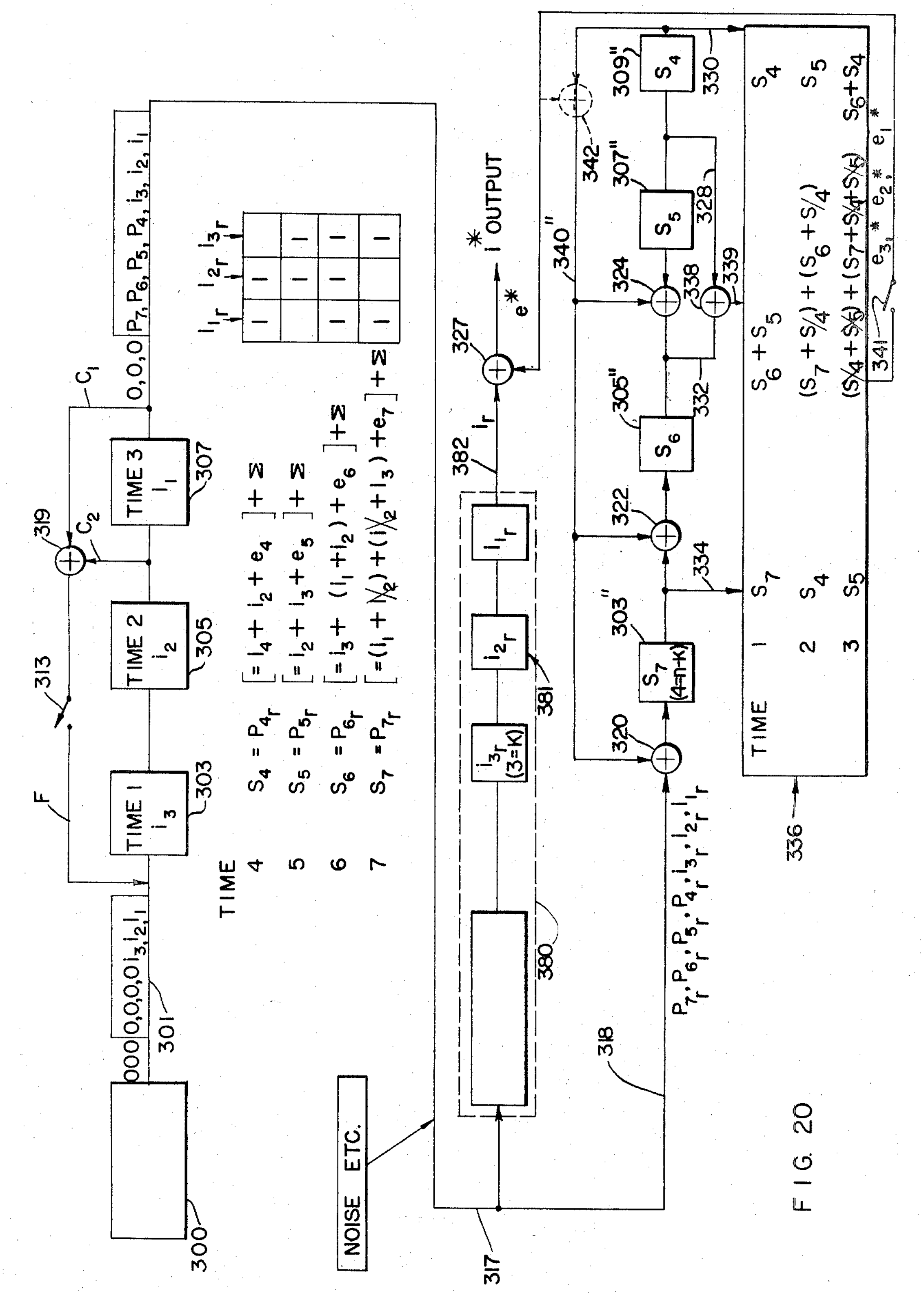
Figure 22:
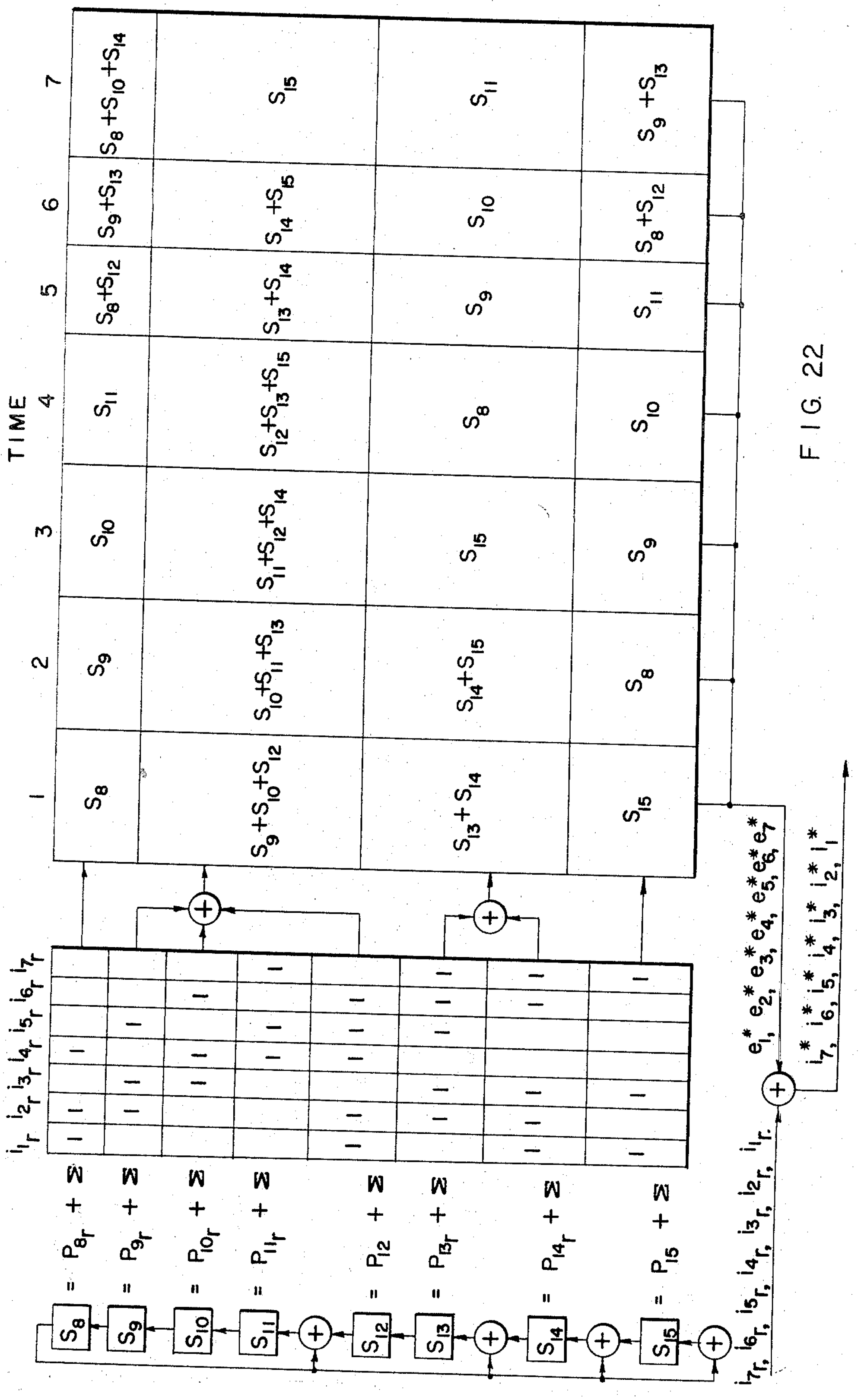
Figure 23:
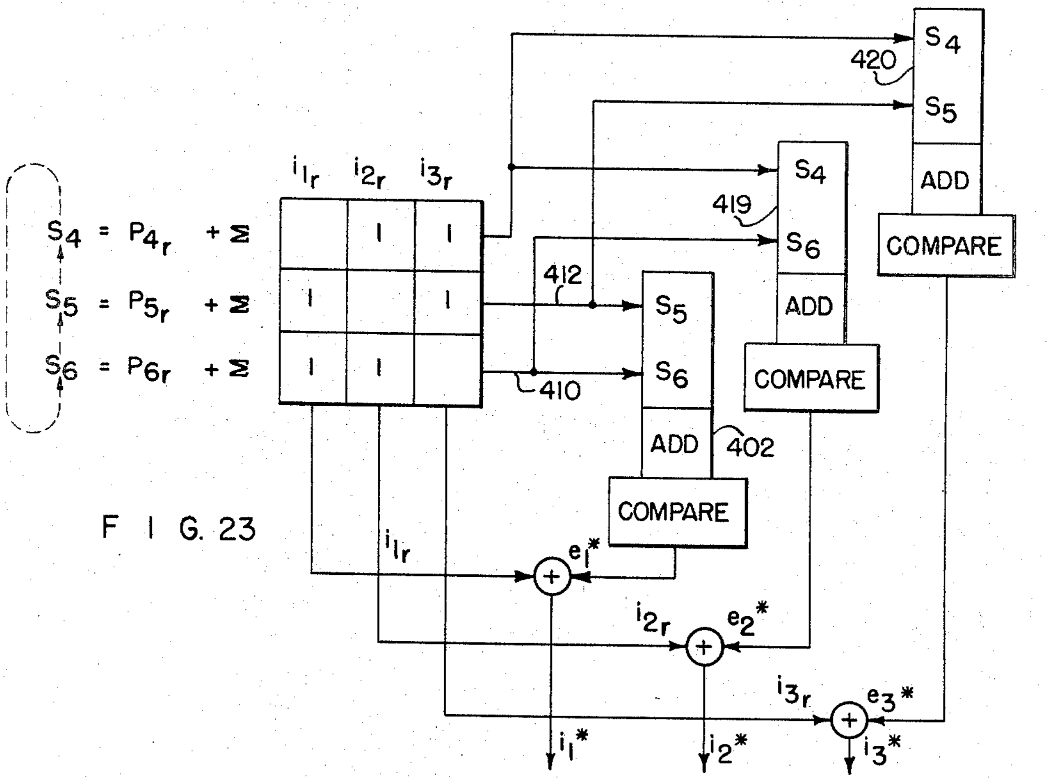
Figure 24:
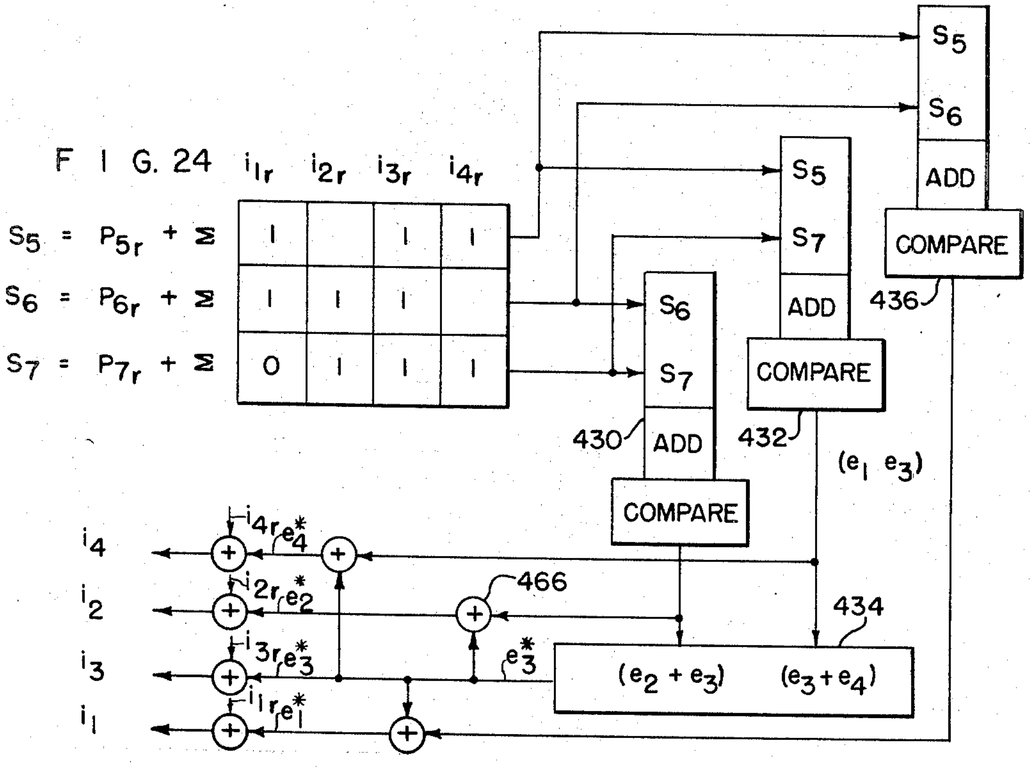
Figure 25:
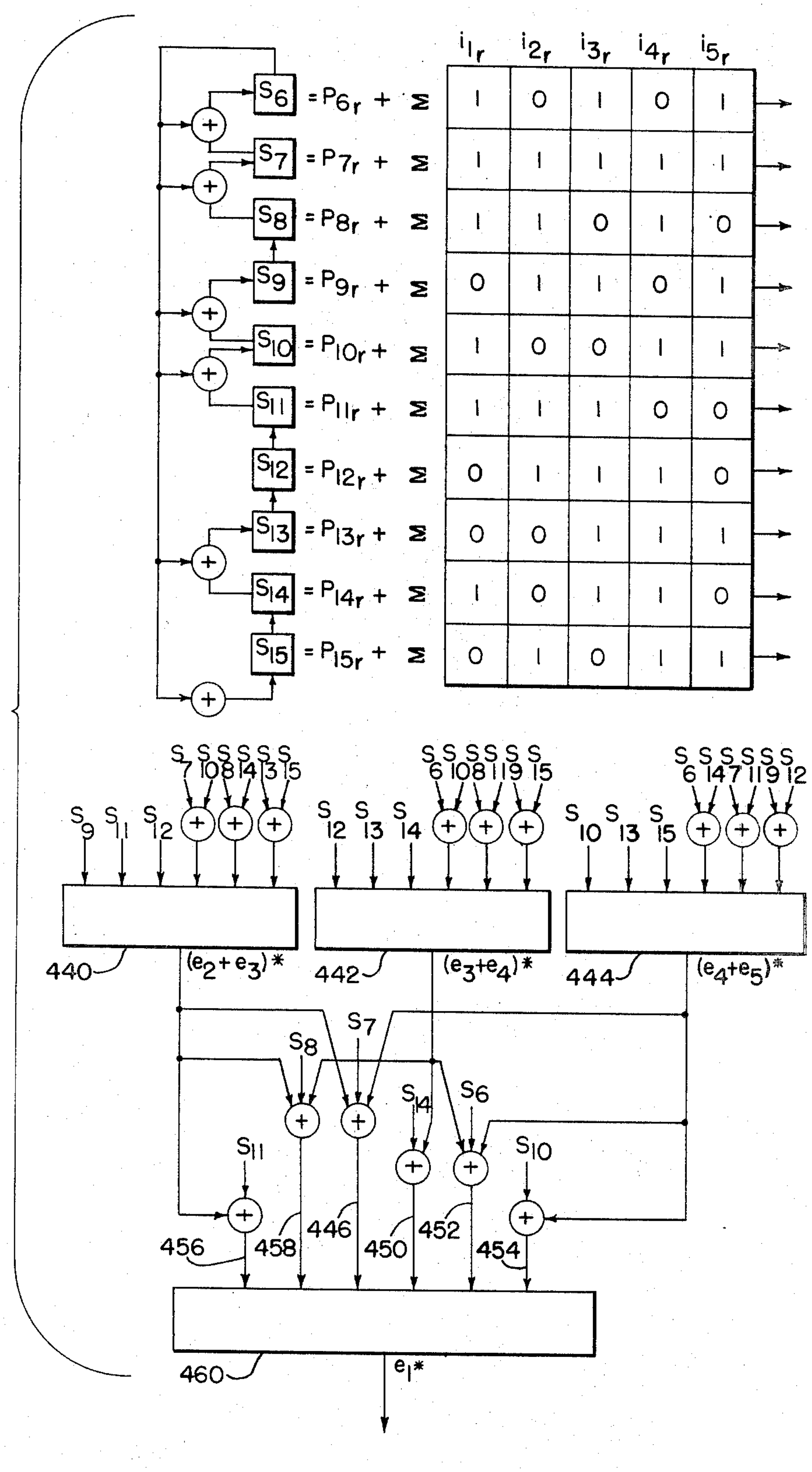
Figure 29:
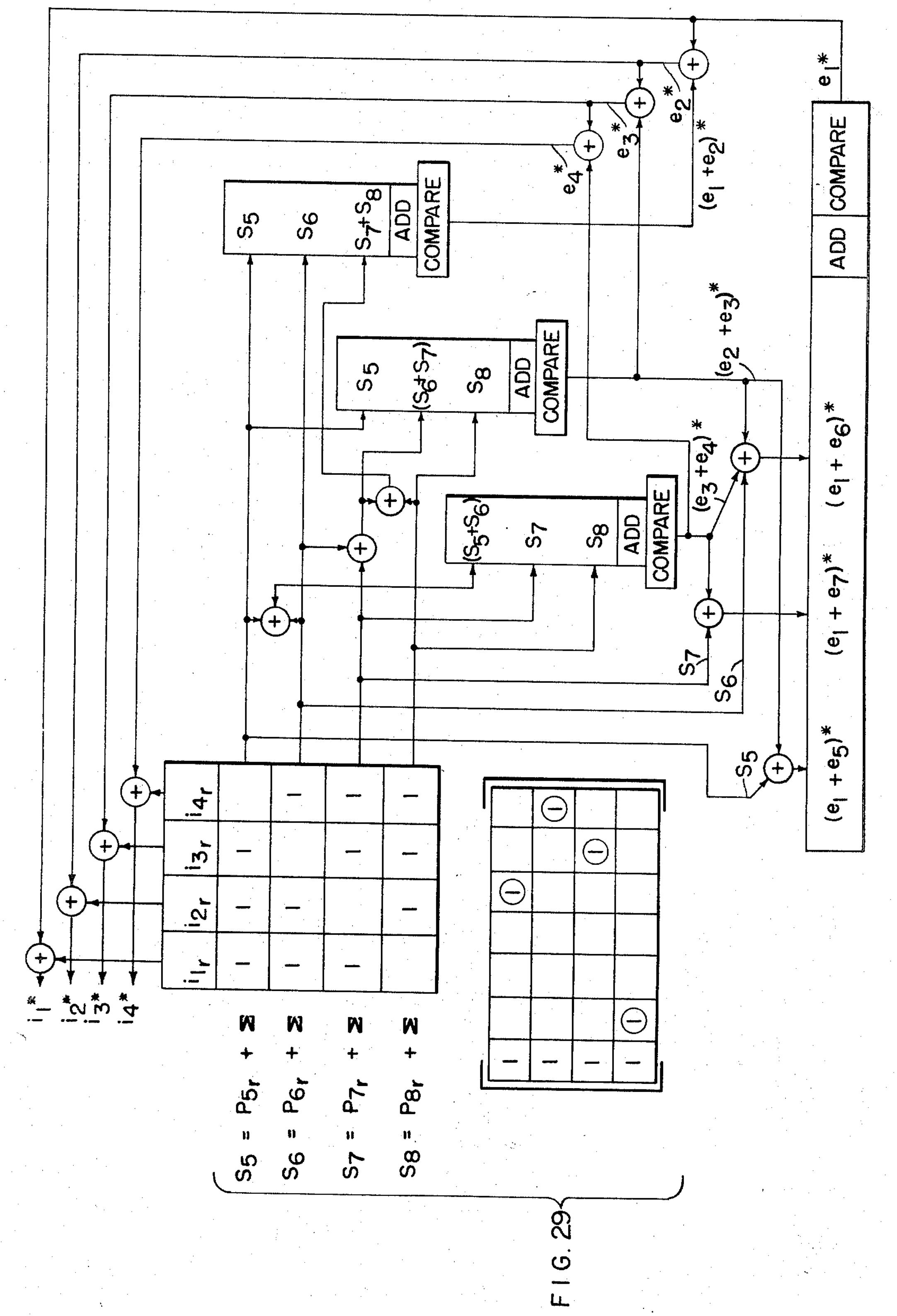

FIG. 4*a* is a block diagram of modifications according to the invention made to the embodiment of FIG. 12 for the case where nonerased signals have a small probability of being incorrect;

FIG. 5 is a circuit diagram of an analogue threshold device;

FIG. 6 is a circuit diagram of a digital threshold device;

FIG. 7 is a circuit diagram of another digital threshold device;

FIG. 8 is a circuit diagram of a digital threshold device that employs a recirculation technique;

FIG. 9 is a general parity check diagram for rate ½ convolutional codes;

FIG. 10 is a parity check diagram of the components and connections of the type I decoding apparatus described above in connection with FIG. 1;

FIG. 11 is a parity check diagram of the components and conections of the type II decoding apparatus described in my U.S. Patent 3,303,333 in connection with FIG. 4;

FIG. 12 is a parity check diagram of the components and connection of a decoder for a rate ½ constraint length 44 convolutional code;

FIG. 13 is a parity check diagram of the components and connections of a decoder for a self-orthogonal convolutional code;

FIG. 14 is a general parity check diagram for rate $1/n_0$ convolutional codes;

FIG. 15 is a parity check diagram of a decoder for a rate ⅓ constraint length 24 convolutional code;

FIG. 16 is a parity check diagram of a decoder for a rate ⅔ convolutional code;

FIG. 17 is a general parity check diagram for rate $k_0/n_0$ convolutional codes;

FIG. 18 is a block diagram of a forward-backward decoder according to the invention;

FIG. 19 is a general parity check diagram for block codes;

FIG. 20 is a block diagram of the components and connections of a type I cyclic sequential decoder for a (7, 3) cyclic block code;

FIG. 21 is a block diagram of the components and connections of a type II sequential cyclic decoder for a (7, 3) cyclic block code;

FIG. 22 is a parity check diagram of the components and connections of a sequential cyclic decoder for a Bose-Chaudri (15, 7) cyclic code;

FIG. 23 is a parity check diagram of the components and connections of a nonsequential decoder for block codes;

FIG. 24 is a parity check diagram of the components and connections of a nonsequential decoder for block codes that enables step-wise orthogonalized decoding solutions;

FIG. 25 is a parity check diagram of the components and connections of a type I sequential decoder for the Bose-Chaudri (15, 5) cyclic code which uses step-wise orthogonalization;

FIGS. 26–28 are circuit diagrams of the components and connections of a type II sequential decoder for the Bose-Chaudri (15, 5) cyclic code; and FIG. 29 is a parity check diagram of the components and connections of a step-wise orthogonalized decoder for Reed-Muller codes.

Figure 1:
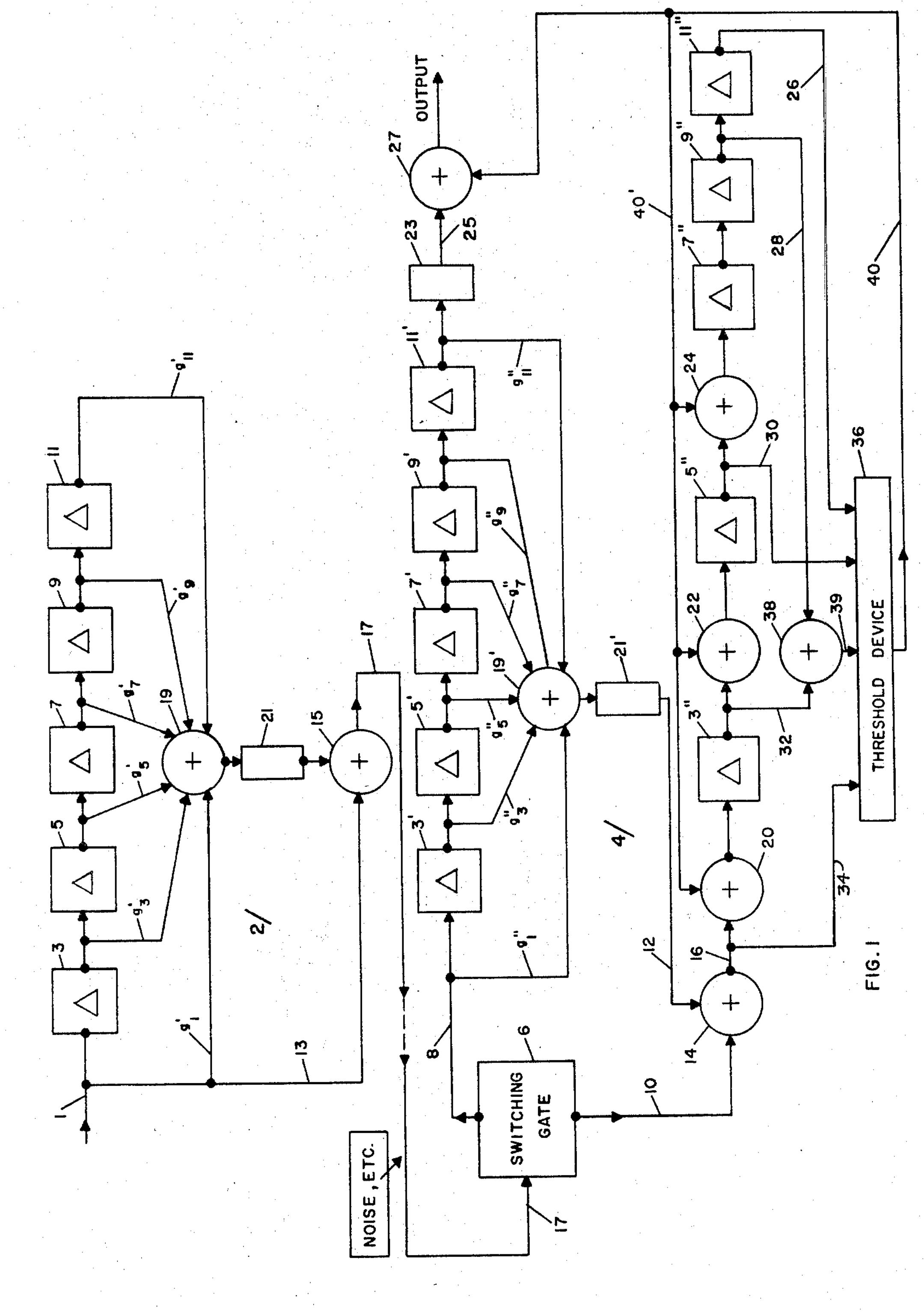

The structure and operation of FIG. 1 are fully described in my U.S. Patent 3,303,333 to which reference is made. Excerpts from that patent follow:

At the input conductor 1 of the encoder portion 2 of the apparatus of FIG. 1, successive signals representing symbols of information or data are applied, say one unit every two intervals of a predetermined reference clock period or frequency, $i_0$, $i_2$, $i_4$, $i_6$, $i_8$, $i_{10}$, etc. If this information were transmitted without encoding, some of the information symbols might become changed, as by noise or other factors in the system, and there would be no way of detecting or correcting those changes or errors. The encoder 2 is employed to supply redundancy to the information sequence; that is, to insert or interpose between the successive information signals, additional signal symbols which are linear functions of the information and which enable the detection and/or correction of such errors, as later explained.

Let it be assumed, for purposes of illustration, that the information symbols are binary signal digits or bits; i.e., a "1" or a "0" bit. This may be encoded in a conventional convolution code, as suggested by P. Elias in an article entitled "Coding for Noisy Channels", Institute of Radio Engineers Convention Record, Part IV, 1955, pp. 37–44, or in other codes, also. For purposes of an example only the invention is explained as applied to a systematic code having a rate ½ (every other signal a redundancy) and a constraint length of 12 (6 information signals within the encoder at any one time and a redundancy signal being generated each time the information signals are shifted one position).

In FIG. 1, the encoder 2 comprises a chain of five serially connected stages of shift register or time-delay 3, 5, 7, 9 and 11. At even instants of time, the symbols $i_0$, $i_2$, $i_4$, $i_6$, etc., are fed along conductor 13 to an adder or gate circuit 15 for passing the same to the encoder output 17.

Redundancy signals are computed by a further adder 19 into which signals are fed directly from the input conductor 1 by way of conductor $g_1'$; from the output of stage 7 (representing a 6-unit delay) by way of conductor $g_7'$; from the output of stage 9 (representing an 8-unit delay) by conductor $g_9'$; and from the output of stage 11 (representing a 10-unit delay), by means of conductor $g_{11}'$. Conductors $g_3'$ and $g_5'$ (from the respective stages 3 and 5) may also be provided.

Thus, with an input comprising successive bits introduced two units of time apart, the input signal may be represented by the expression:

$$I=i_0+i_2D^2+i_4D^4+i_6D^6+ \ldots i_{10}D^{10} \ldots \quad (1)$$

meaning, bit $i_2$ is delayed two units; bit $i_4$, four units; and so on. The encoder code or generator sequence may be of many different types, but the preferred convolutional code $g$ is as follows:

$$g=1+g_1D^1+g_3D^3+ \ldots g_{11}D^{11} \ldots \quad (2)$$

meaning, that if $i_0$ is "1", and all other information signal symbols are "0," the encoder output will be unity at the initial time, and will have value $g_1$ after one unit of time; $g_3$ after three units of time; and so on. For a more general sequence, the encoder output $t$ will be the product of the input (Equation 1) and the generator or code sequence (Equation 2), namely, $$t=(I)(g) \quad (3)$$

where $t$ is the entire digital message stream, I is the entire digital stream of information components and $g$ is the generator sequence. With systematic codes, that is, codes such as the example above in which the generator sequence commences with the integer 1, each information component $i_0$, $i_2$, $i_4$, etc., appears by itself in the message stream at some unit of time as well as becoming a term in a multiplicity of redundancy components in the message. With such codes the information components $i_0$, $i_2$, $i_4$, etc., and the redundancy components $p_1$ (equaling $g_1i_0$), $p_3$ (equaling $g_3i_0+g_1i_2$), $p_5$ (equaling $g_5i_0+g_3i_2+g_1i_4$), etc., together comprise the digital message components of the stream $t$, each $g_1$, $g_3$, $g_5$, etc., in the binary case can take the value of either "1" or "0", the particular "$g$'s" that are "1's" depending on the specific code chosen. In this mathematical treatment, it is to be understood that the operations of multiplication and addition are carried out as in binary-number logic, such that $1\times1=1$, $1\times0=0$, $0\times1=0$ and $0\times0=0$; and $1+1=0$, $0+0=0$ and $1+0$ or $0+1=1$ (so-called "modulo-two" arithmetic).

These encoded signals are shown transmitted in any desired manner to a receiving-and-decoding apparatus 4, schematically shown as transmitted along the path 17, with "noise" or other interfering factors effecting possible changes in the transmitted sequence. At the even time-unit intervals corresponding to the original input signal-information bits $i_0$, $i_2$, $i_4$, etc., there will be received, at the receiver decoder 4, corresponding signals $i_{0_r}$, $i_{2_r}$, $i_{4_r}$, etc., some of which may be spuriously changed from "1" to "0," or vice versa, by the effects of noise or other influences. These error effects may be indicated by symbols $e_0$, $e_2$, $e_4$, etc., representing noise-signal influences, referred to herein as "error components," which may be unity in the case of causing a change in the transmitted bit, or zero if no change has occurred. At the odd time units the redundancy signals $p_{1_r}$, $p_{3_r}$, $p_{5_r}$, etc., are received, affected by noise components $e_1$, $e_3$, $e_5$, etc.

The first function of the decoder 4 is to separate the received even-time information symbols $i_{0_r}$, $i_{2_r}$, $i_{4_r}$, etc. (with their possible errors $e_0$, $e_2$, $e_4$, etc.) from the supplemental or redundancy signals therebetween; in this case, the signals at the odd time-unit intervals. This is effected by an alternating or switching gate 6, operating at the frequency of the reference clock, alternately to feed successive received signals along paths 8 and 10 for even and odd time-unit intervals, respectively.

The even-time information symbol signals are preferably fed into a substantial replica of the original chain of shift-register encoding circuit 3–5–7–9–11–19–21, represented by the same symbols with prime notations 3′–5′–7′–9′–11′–19′–21′. Conductors $g_1''$ through $g_{11}''$ correspond to conductors $g_1'$–$g_{11}'$ of the encoder 2, with conductors $g_3''$ and $g_5''$ considered as disconnected or open-circuited for the illustrated example.

In the absence of any error E, the output of the single delay stage 21′ will clearly be equal to the supplemental or redundancy signals at the odd time-unit intervals, referred to as simulated redundancy signals. This output is fed along conductor 12 to an adder 14 into which the odd time-unit interval redundancy signals from the message are directly fed by conductor 10. Thus, the output of adder 14 at 16 is always zero if no error components in the transmitted redundancy and information symbol signals have occurred. This output at 16 may be represented by the product of the error components at the even time-unit intervals and the generator or code sequence (Equation 2) plus the entire noise sequence at the odd time-unit intervals, since any output at 16 can only be caused by the noise signals. The error signal components S of the output may be shown to comprise the following groups at the odd-unit instants of time:

$$S_1=g_1e_0+e_1$$

$$S_3=g_3e_0+g_1e_2+e_3$$

$$S_5=g_5e_0+g_3e_2+g_1e_4+e_5$$
$$S_7=g_7e_0+g_5e_2+g_3e_4+g_1e_6+e_7$$
$$S_9=g_9e_0+g_7e_2+g_5e_4+g_3e_6+g_1e_8+e_9$$
$$S_{11}=g_{11}e_0+g_9e_2+g_7e_4+g_5e_6+g_3e_8+g_1e_{10}+e_{11}, \text{ etc. } (6)$$

For the previous example, $g_1=v$, $g_3=g_5=0$, and $g_7=g_9=g_{11}=1$, this reduces to $$S_1=e_0+e_1$$
$$S_3=e_2+e_3$$
$$S_5=e_4+e_5$$
$$S_7=e_0+e_6+e_7$$
$$S_9=e_0+e_2+e_8+e_9$$
$$S_{11}=e_0+e_2+e_4+e_{10}+e_{11} \quad (7)$$

This sequence may be called a sequence of parity checks, as later explained. The following four equations may now be evolved:

$$S_1=e_0+e_1$$
$$S_3+S_9=e_0+e_3+e_8+e_9$$
$$S_7=e_0+e_6+e_7$$
$$S_{11}=e_0+e_2+e_4+e_{10}+e_{11} \quad (8)$$

These four equations have the property that $e_0$ enters into each equation, and no other error component enters into more than one equation. It follows that one can correctly determine $e_0$ provided there are at most two errors in the eleven symbols in this set of equations, by using the rule: $e_0=1$, if three or more of the equations of set (8), above, have a value of one; and $e_0=0$, otherwise. Such a set of equations is termed a set of parity checks (or, more generally, subsolutions) orthogonal on $e_0$.

In the system of FIG. 1, with the illustrated example, circuitry is provided for sensing whether three or more of the equations of set (8) have a value of one. This is done by applying the output at 16 to a further shift-register bank comprising 2-unit delay circuits 3″, 5″, 7″, 9″ and 11″, with adder circuits, for a reset purpose later explained, interposed at 20, 22 and 24, in the input of respective stages 3″, 5″ and 7″.

At time of the eleventh-unit time interval, the error signal $S_1$ has arrived at the output 26 of the stage 11″; error signal $S_3$ is at the output conductor 28 from stage 9″; error signal $S_7$ is at output conductor 30 from stage 5″; error signal $S_9$ is at output conductor 32 from stage 3″; and error signal $S_{11}$ is at output conductor 34 at the output 16 of the adder 14. These signals $S_1$, $S_3$, $S_7$, $S_9$ and $S_{11}$ correspond to all the errors in the set of Equation 8. The signal $S_1$ (represented by the first equation of set (8)) is applied by conductor 26 to a threshold-signal-operated circuit 36, later discussed. The signal $S_3+S_9$ (represented by the second equation of set (8)) is produced by connecting conductors 32 and 28 to a further adder 38 and applying the output thereof at 39 to the circuit 36. Signals $S_7$ and $S_{11}$ (the third and fourth equations, respectively, of set (8)) are respectively applied to the circuit 36 by conductors 30 and 34. The threshold voltage of operation of circuit 36 is adjusted to produce a "1" output at 40 when three or more of the above inputs thereto are "1." The output 40, referred to as a solution signal, will thus provide the decoded estimate of the value of the error signal $e_0$ by the rule above described, being fed to another adder 27 at this eleventh-unit interval of time.

By connecting a further single-unit delay device 23 in the output of the stage 11′, there will be produced at 25, the first received information symbol signal $i_{0_r}$ at the same eleventh unit of time just discussed. This symbol signal is also applied to the adder 27, resulting in the addition of the information signal $i_{0_r}$ (equal to $i_0+e_0$) to the determined value of $e_0$. This addition "adds out" $e_0$, changing the information symbol signal from "1" to "0" or from "0" to "1" in the event that the error output at 40 indicates that the noise or other factors introduced an erroneous change in transmission in connection with information symbol $i_{0_r}$. Similar remarks apply to the successive information symbol signals.

If such an error has thus been detected and corrected, it is necessary to reset the adders 20, 22, 24 to add-out the $e_0$ components that remain as terms in the stored parity check signals $S_9$, $S_7$ and $S_{11}$ so that they are ready to indicate further errors. This is effected by feeding back the signal $e_0$ from the output 40, along conductor 40′, to each of the adders 20, 22, 24, thus to restore the same to the condition prior to the detection of the previous error; i.e., to remove the signal $e_0$ and permit the circuit to operate with the next information symbol signal $i_{2_r}$ as if this were the first signal $i_{0_r}$ all over again.

MONITORING THE DECODER OPERATION

Since the error-correcting capability of the threshold decoding procedure always has a upper limit, established by the number of subsolution signals that control inputs to the threshold device, it is desirable to monitor the decoding procedure to learn when the error-correcting capability has been exceeded. This is of particular importance in sequential decoding wherein the solution for one signal is used in arriving at the solution for the following signals.

One mode of detecting decoder failure is to sacrifice some of the error-correcting power of the code by inserting an alarm zone in its threshold decision. For example, the code described in connection with FIG. 1 has a rate ½ with a constraint length of 12 bits, and 4 orthogonal subsolution signals control inputs to the threshold device. In the unweighted case if there are no errors in the signals forming the subsolution signals, the input sum to the threshold device will be zero; if a single error the input sum will be 4 or 1, 4 if the error is in the signal being decoded; and if there are two errors the input sum will be 3 if one of the errors is in the signal being decoded or two or less otherwise. So long as no more than two errors occur, if the threshold sum exceeds ½ the sum of the four inputs, an error has occurred in the signal being decoded, otherwise not, thus giving an error-correcting capability of 2. By establishing an alarm zone about the threshold value one can change the decoding decision to operate by the rule: if the sum of the inputs to the threshold device is one or zero, the information signal being decoded is correct; if it is 4 the information signal is incorrect; if it is 2 or 3 there are at least 2 errors present and an alarm is to be sounded. This gives an error-correcting capability of one error and an error-detecting capability for all cases of two and three errors, since when three errors occur the sum is two or more if an error has occurred in the signal being decoded and the sum is three or less otherwise.

A similar alarm zone can be used for the threshold device for all threshold decoding procedures whether for block or convolutional codes and whether weighted or unweighted inputs are employed.

Another way to learn when the error-correcting capability of the decoder has been exceeded is to count the apparent number of errors in the signal stream, i.e., the number of symbols changed in the decoding process, and to energize an alarm if this number of errors is more than the decoding procedure can handle. To do this effectively, the errors in the redundancy signals should be counted as well as the errors in the information signals. By doing this the decoding procedure can be monitored without sacrificing error-correcting power. The redundancy signal errors can be evaluated and counted through a comparison of the signals that have been stored for decoding purposes. Referring again to the example described in connection with FIG. 1, employing the rate ½, constraint length code 12, the Equation 8 above shows that the initial parity check $S_1$ (which resides in shift register stage 11′ at the time of decoding $i_0$), formed from the initial redundancy signal, contains $e_0+e_1$, $e_0$ being the error in the information signal $i_{0_r}$ being decoded, and $e_1$ being the error in the initial redundancy signal. If $T_s$ represents the solution signal output of the threshold device 36 or some other decision element, $T_s$ being zero when no correction is made and one when a correction is made to $i_{0r}$, then the most probable meaning of each configuration of the values $S_1$ and $T_s$ is given by the following table:

| Initial Parity Check $S_1$ | Threshold Output $T_s$ | Error of Signal being Decoded $e_0$ | Error of Redundancy Signal $S_1+T_s$ | $e_1$ |
|---|---|---|---|---|
| 0 | 0 | 0 | 0 | 0 |
| 1 | 0 | 0 | 1 | 1 |
| 0 | 1 | 1 | 1 | 1 |
| 1 | 1 | 1 | 0 | 0 |

From the table it is seen that by sensing the values of $S_1+T_s$ and $T_s$ for each information signal as it is decoded, a counter can count whether there appears to be zero, one or two errors in the pair of information and redundancy signals $i_0$ and $p_1$ at the end of the decoder. It is then possible to employ a common alarm device which may have any of a variety of alarm criteria relating to the count, for example, for the two-error corecting code the alarm could be energized if there appeared to be three or more errors within twelve consecutive signals. The optimum alarm setting would depend upon the nature of the error patterns to be expected so that no general rule can be stated. This procedure is applicable to all examples of the decoding procedure given in this specification, it being understood that when more than one redundancy signal appears for each information signal so that there are multiple chains of parity checks, then the initial parity check in each chain$+T_s$ would be counted.

Figure 2:
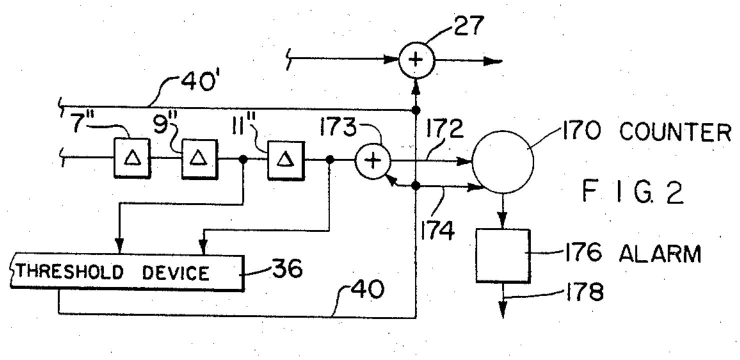
FIG. 2 is a block diagram of means according to the invention for counting errors to monitor the operation of the decoder.

As an example of a preferred embodiment, referring to FIG. 2, the decoder of FIG. 1 is modified to incorporate a modulo-two adder 173 and a counter 170. The modulo-two adder 173 forms $S_1+T_s$ which from the preceding table is seen to be a "one" when the redundancy signal is most probably in error. The counter 170 is adapted to count zero, one or two for each shift of the decoding device, depending upon whether zero, one or two of the inputs are "one." An input 172 from the modulo-two adder and an input 174 from the solution signal line 40 from the threshold device 36 are connected to the counter 170. The output of the counter 170 is connected with an alarm threshold device 176. This alarm device keeps track of the counts and energizes an alarm output 178 whenever a preselected number of counts occur within a preselected number of shifts of the decoder.

Where highly reliable two-way communication is desired, faulty operation of the decoding procedure can be detected after a small number of subsequent decoding operations by means of supplementing the signals stored by the decoder by a means whereby the supplements are added out so long as the decision of the threshold device is correct. When incorrect, the random values change the subsolution signals in the subsequent decoding operations and cause the decoding procedure to indicate that further errors exist even though in fact they do not. This will cause even further random signals to be added in a cascading effect. Thus a single instance of exceeding the decoder's capacity will reveal itself by the presence of a large number of "corrections" made by the decoder over a short time span of received signals, in excess of the errors that the decoder itself is known to be capable of correcting reliably, and this action may be sensed and an alarm energized to call for repeat of the data or the like.

Figure 3:
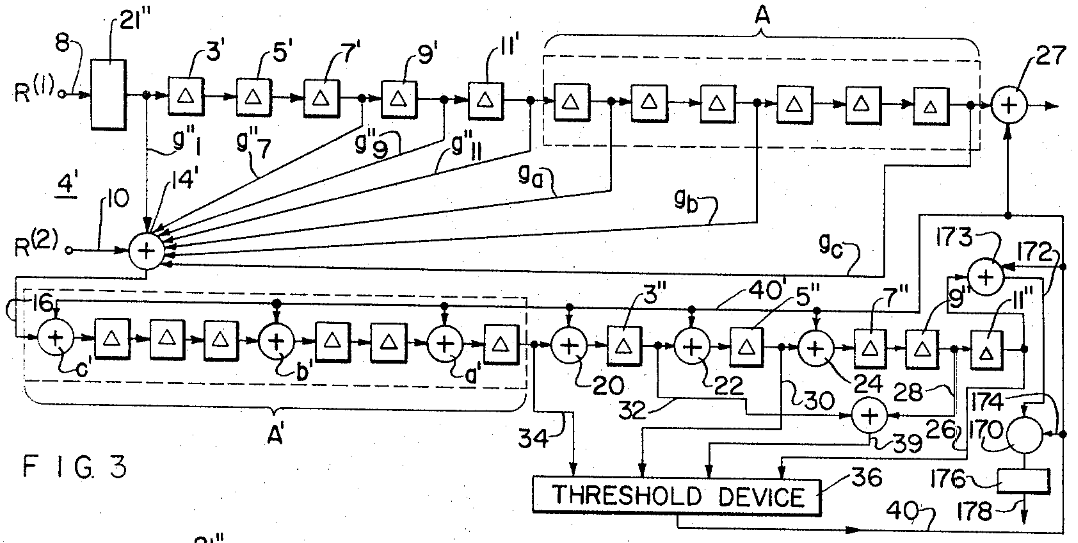
FIG. 3 is a block diagram of means for randomly supplementing the signals in the decoder according to the invention for highly sensitive monitoring of the decoder operation.

A preferred embodiment for random supplementation is shown in FIG. 3 that employs for the example the rate ½ constraint length 12 code that was illustrated in connection with FIG. 1. Referring to FIG. 3, the decoder 4', has a shift register chain A comprised of six stages added to the original chain of shift registers 3'-5'-7'-9'-11', the encoder being identical to the decoder. As a slight modification from the embodiment of FIG. 1, instead of the information signals in the replica chain being added together by adder 19', delayed by one unit at 21', and then added to the redundancy signals to form the parity checks, the information signals arriving on line 8 are delayed one time unit by means 21'' before being applied to the information register chain, and the contents of the register are applied by conductors $g_1''$, $g_7''$, $g_9''$ and $g_{11}''$ directly to modulo two adder 14' at which the information signals and the redundancy signal are combined to form parity checks. Both the information and parity shift registers are shifted once each two time units. As with the embodiment of FIG. 1, the parity check signals are applied by conductor 16 to a parity check shift register 3'', 5'', 7'', 9'' and 11'' with the exception, however, that a chain A' of six shift registers is interposed between the modulo two adder 14' and the first stage 3'' that plays a part in the threshold decoding procedure. No connections from the chain A' to the threshold device 36 are made. The feedback 40' from the threshold device 36 applies inputs to modulo two adders *a'*, *b'* and *c'* for the purpose in normal operation to add out the error components of the received information signals that have already been decoded that were applied to adder 14' by $g_a$, $g_b$, and $g_c$ so that the signals arriving at adder 20 following chain A' comprise true parity checks. When the error-correcting capacity of the decoder is exceeded and the threshold device 36 emits a solution signal along conductor 40 that is incorrect, the inputs to adders *a*, *b* and *c* will not add out the error component of the information signal being decoded that was applied along conductors $g_a$, $g_b$ and $g_c$, hence the signals arriving at adder 20 are not parity checks for the following information signals but are supplemented by the random signals of the feedback of line 40'. With subsequent shifts of the decoder, the contents of the chain A' enter the shift register chain 3'', 5'', 7'', 9'' and 11'' and cause further errors from the threshold device 36 which are fed back along conductor 40' to adders *a*, *b* and *c* to multiply the effect of a single error in a short time. A counter 170 is connected to threshold device output line 40 and the output of adder 173 to count the number of corrections being made by the decoder and an alarm threshold device 176 is connected to the counter 170. A suitable detection rule for this decoding circuit would be, for example, that the decoder has operated improperly if more than 2 "ones" are counted in any six consecutive shifts of the parity shift register.

As an alternative to requesting the repeat of information, it is possible to reset the decoding apparatus to reduce the probability that the previous erroneous solutions will propagate to cause further erroneous solutions. A simple way to do this in type I decoding is to set the entire contents of the parity check register to zero when the error alarm is energized, while retaining the contents of the information signal register and allowing the decoder to continue its operation. The inputs to the threshold device will then be maintained at a value below the threshold value until a number of shifts of the decoder have occurred to shift in new parity check signals which will let through, uncorrected, some of the errors in information signals present in the decoder at the time of the propagating to cause others. When continuing operation after such reset, the redundancy signals reaching the decoder are not at all like those at start-up, since they contain the full *g* complement of information signal components. However, since the corresponding received information signals remain in the decoder, the information components can be added out. The error components of these signals are, it is true, still present, and can affect the decision logic, but it is found in most instances that when the error density has returned to normal, the decoder will rapidly reconverge to correct operation. Methods for setting the contents of the S registers to zero are well known in the art of digital circuitry and need not be specified here.

A similar technique can be used whenever it is desired to restart the encoder and decoder eliminating the influence of previous signals. This would normally be done, for example, when the communication system was first started after a period of shut-down. Alternatively, the parity check registers in the decoder, and the information signal registers in both encoder and decoder could be filled with a stream of zeros before actual signals were fed into them rather than employ reset circuitry.

FURTHER EXAMPLES OF WEIGHTING THE THRESHOLD INPUTS

As has been indicated in my U.S. Patent 3,303,333, a very important aspect of the invention is the concept of weighting the inputs to the threshold device. In one important aspect this involves fixed but nonuniform weighting for the purpose of compensating for some subsolution signals being modulo two sums of more error components than others as may occur, for instance, when some of the subsolution signals are formed as composities. By preselected unequal weighting, each threshold input is given a number of "votes" toward the solution signal based on the probability that the corresponding subsolution is correct whereby the decoder error correcting power is increased. Thus for the code of the example given in connection with FIG. 1, by the nonuniform weighting more corrections can be made when three errors are present in the subsolution signals than is possible with uniform weighting.

Time-variable weighting may be used advantageously when the error probability of received digits changes with time. For this weighting, channel information such as the strength of the signals being received is sensed to evaluate the reliability of signals being received, and the most reliable signals are given more weight in the threshold decision than are the less reliable ones. The formulas given in my U.S. Patent 3,303,333 in connection with FIG. 6 define the preferred general time-variable weighting.

An especially simple, but practically important, case of time-variable weighting is applicable to the binary erasure channel. In this known channel if a signal is not received clearly it can be assigned an erasure value, hence there is no risk that a "1" signal will appear "0." According to the invention a record is kept of the signals which are assigned erased values and for time variable weighting it is assumed that the nonerased bit has a negligible probability of error while an erased value is totally uncertain. The weighting factors are, therefore, scaled to be "0" for the subsolution signals containing any erased bits and "1" for subsolution signals containing no erased bits, the threshold value is established at zero, and any single subsolution signal or parity check that contains no erased signals will cause the threshold value to be exceeded. This permits the weighting factors to be computed by simple "and" gates and the threshold device to be an "or" gate. Referring to FIG. 4, a decoder similar to that in FIG. 1 is shown with the addition of devices for sensing and storing the erasure information, applying the weighting and calculating the solution signal. A sensing device 6e senses along line 17e whether or not valid signals or erasures are being received and applies the digital erasure data to lines 101 and 102 for information and redundancy signals respectively. To this end a first erasure memory chain $C^{(1)}$ has a unit delay 21‴ followed by a number of stages sufficient to store the erasure data for the information signals in the constraint length 3′, 5′, 7′, 9′, 11′. When sensing device 6e determines, an incoming information signal is erased, the sensing device 6e applies a "0" along line 8, which is delayed one unit by 21″ and then passes into the information register, and simultaneously a "0" is applied to erasure memory chain $C^{(1)}$ on line 101. If no erasure occurs, the received value of the information signal, "0" or "1" is applied along line 8 and a "1" is simultaneously applied on line 101. Likewise, a second erasure memory chain $C^{(2)}$ has a number of stages sufficient to store the erasure data for the redundancy signals in the constraint length and when the erasure of a redundancy signal is sensed, a "0" is applied to line 10, and a "0" is applied to line 102 for erasure memory chain $C^{(2)}$, but when no erasure occurs, the received value of the redundancy signal is applied to line 10 and a "1" is applied to line 102. The two erasure memory chains are simultaneously shifted once each two time units. Connections are made between the two erasure memory chains to "and" gates (or multipliers) 103, 104, 105 corresponding to the signal constituents of $S_{11}$, $S_3+S_9$ and $S_7$, respectively, excepting the received information signal being decoded, and these in turn are connected to "and" gates 107, 109, 111 to which are also connected the values $S_{11}$, $S_3+S_9$ and $S_7$, respectively. A further "and" gate 113 is connected to $S_1$ and to the last stage of erasure memory chain $C^{(2)}$ representing the initial redundancy signal. The output of "and" gates 107, 109, 111 and 113 are applied to "or" gate 36′ which replaces the more complicated threshold element 36 of FIG. 1 because of the simplicity of this channel. The reason for this simplification is that the threshold will be exceeded whenever any one of these inputs is "one," so that a simple logical "or" circuit can be used to perform the ordinary arithmetic addition of the subsolution inputs and the comparison to the threshold value.

The "or" gate 115 in FIG. 4 provides a check on the decoder operation. It has as inputs the outputs of "and" gates 103, 104, 105 and line 105′ to apply the erasure data for the subsolution signals, and as a further input the contents or erasure storage stage 11e, containing the erasure data for the information signal being decoded. When the output of "or" gate 115 is a "0," an error alarm is energized. The reason for this is that the output is "0" only in the event that all of the subsolution signals contain erased bits and the information signal being decoded is itself erased. In this event, the decoder can make no valid decision on the value of the information signal being decoded.

Essentially the same decoder can be employed with a channel where the nonerased bits have a non-zero but very small probability of being incorrect. Referring to FIG. 4*a*, the only changes from the FIG. 4 apparatus are that "or" gate 36′ is replaced by a threshold device 36e whose output is "1" when the number of input "1's" from "and" gates 107, 109, 111, 113 exceeds the threshold value of one half the number of "1's" on the input lines to "or" gate 115 as calculated by half adder 36f. "Or" gate 115 is still retained to indicate when the decoder is likely to fail.

FURTHER EXAMPLES OF THRESHOLD CIRCUITS

The circuits used for the threshold devices may be any of the familiar types used in the analog computer or digital computer arts. In those arts the design of a threshold device is usually complicated by the need to discriminate between critical instances in which the sum of the inputs is just above or just below the value of the threshold setting. An advantageous feature of the invention is that in these critical instances the probability of a decoding failure is substantially one half so that the decoding operation is not substantially degraded by the failure of the threshold device to give the correct output in these critical instances. For this reason, simple threshold circuits of the type shown in FIG. 3 of my U.S. Patent 3,303,333 can often be employed advantageously. However, when the number of threshold inputs becomes large or when optimum decoding performance is essential, more sophisticated design techniques may be advantageously employed.

A. *Analog circuits*

In FIG. 5 each of the subsolution signals for the threshold device is applied to terminals *a*, *b*, *c*, *d* and *e*, respectively, each having a value of zero volts when it is to have the digital value "zero" and $V_1$ volts when it is to have the digital value "one." The subsolution signals are weighted inversely by the resistors $R_1$ to $R_5$, respectively, and directly by the common resistor $R_6$ to produce inputs to the threshold operation and the amplifier *f* computes the ordinary arithmetic sum of these inputs at its output *g*. Thus, if only the subsolution signals at terminal *a* has the value "one," the voltage at *g* will have the value $$\frac{R_6}{R_1}V_1$$

In general, if all the subsolution signals A, B, C, D and E have the values "one" or "zero" then the output voltage $V_0$ at *g* is given by the formula:

$$V_0=R_6\left[A\frac{1}{R_1}+B\frac{1}{R_2}+C\frac{1}{R_3}+D\frac{1}{R_4}+E\frac{1}{R_5}\right]V_1$$

Here the inverse values $1/R_1 \ldots 1/R_5$ are the weights applied to the respective subsolution signals.

When all the subsolution signals are "one," the expression (1) has its maximum value. The corresponding maximum voltage at *g* may be arbitrarily chosen as $V_2$ and set by choice of the value of $R_6$. The second amplifier, *h*, compares the ordinary arithmetic sum at *g* against a threshold value, indicating by its output whether the voltage at *g* is greater or less than one half of $V_2$. $V_3$ is the reference voltage which is chosen somewhat greater than $\frac{1}{2}V_2$ but somewhat less than the smallest possible weighted sum which exceeds $\frac{1}{2}V_2$. The resistors $R_7$ and $R_8$ provide positive feedback for a more definite indication but are not necessary to the operation.

Other functions which may be needed for specific practical circuits are:

(1) The use of voltage limiters or clippers of any of several familiar types to establish the value of $V_1$ and of the "zero" level within close tolerance where the normal variations in the voltage values of the subsolution signals as they come from the memory and adders could obscure the critical digital value of the expression; and (2) The use of biasing networks for the subsolution signal inputs to bring the nominal voltage value of a "zero" subsolution signal to zero volts. Alternatively, compensations can be made at the amplifier.

All the circuitry that is required can be of standard form in accordance with available textbooks and manuals of manufacturers of analog equipment, two good references being Korn and Korn, Analogue Computers and George A. Philbrick Research Associates, Inc., Application Manual for K–2 series.

B. *Digital threshold circuits*

The following circuits are shown for purposes of example as being adapted for the rate ½ constraint length 12 code of FIG. 1, but these circuits obviously can be generalized to other codes. These circuits are representative of digital techniques, not exhaustive.

The threshold circuit may be synthesized by digital logic based on determining for which combinations of input values the output solution signal should be "one." For the example used above, if all four subsolution signals A, B, C and D are weighted equally, the majority rule demands that any combination of three or four inputs equal to "ones" give a "one" output. There are four such combinations of three, by a common arithmetic rule, and one of four. The majority condition may be re-stated:

The output should be "one" if

A and B and C are "ones," or A and B and D are "ones" or

A and C and D are "ones," or B and C and D are "ones."

As used in logic statements the word "or" does not mean that the condition applies to the exclusion of other possible conditions; hence it is understood that the above statement carries the further implication " . . . or any pair of such triplets have ones or any trio of such triplets have one or all four triplets have ones."

FIG. 6 is a circuit realization of the above statement, constituting a digital threshold circuit. Any threshold circuit, including those in which unequal weighting of the inputs is employed, can be realized by this method as is well known in the state of the art of digital circuits.

C. *Combination of threshold circuitry with circuitry for providing composite subsolution signals*

The subsolution signals employed in FIGS. 5 and 6 in some cases do not represent ordinary direct parity checks but rather composite parity checks. Thus, for the rate ½ restraint length 12 code as illustrated in FIG. 1: A is $S_1$; B is the modulo 2 sum of $S_3$ and $S_9$; C is $S_7$; and D is $S_{11}$.

The modulo two summation of $S_3$ and $S_9$ can be incorporated into the same logic circuit as the threshold device to simplify the equipment as a whole. Logically any composite parity check that is the modulo 2 sum of two ordinary parity checks is equal to "one" if either of the ordinary parity check constituents is equal to "one," but not if both are. $S_3+S_9=1$ if and only if $S_3$ and not $S_9$ are one, or $S_9$ and not $S_3$ are one, as $(S_3\overline{S}_9)\vee(\overline{S}_3S_9)$ where the bar indicates the negation or logical complement of the factor and the symbol V indicates "or." The expression of the majority rule for unweighted case of FIG. 14

$$(ABC)\vee(ABD)\vee(ACD)\vee(BCD)$$

may therefore be expressed in terms of the parity check inputs by substituting for A, B, C, D:

$$(S_1[(S_3\overline{S}_9)\vee(\overline{S}_3S_9)]S_7)\vee(S_1[S_3\overline{S}_9)\vee(\overline{S}_3S_9)]S_{11})\vee (S_1S_7S_{11})\vee([(S_3\overline{S}_9)\vee(\overline{S}_3S_9)]S_7S_{11})$$

this can be multiplied out to:

$$S_1S_3S_7\overline{S}_9\vee S_1\overline{S}_3S_7S_9\vee S_1S_3\overline{S}_9S_{11}\vee S_1\overline{S}_3S_9S_{11}\vee S_1S_7S_{11}\vee S_3S_7\overline{S}_9S_{11}\vee\overline{S}_3S_7S_9S_{11}$$

and built as in FIG. 7 where the plus sign "+" represents the value of the contents of the respective parity check storage stage and the minus sign "—" represents the value of the logical complement thereof. This circuit is simpler than the cascade of FIG. 6 in that fewer levels of gates are involved.

Another embodiment of a digital threshold circuit is shown in FIG. 8. It operates according to the theory that if a pulse counter is fed with a pulse for each of the subsolution signals that is a "one" at any one shift of the decoder, and a watch kept each shift for the count that indicates one more than half the number of these subsolution signals is "one," then the existence of this count indicates the majority decision that the solution signal is a "one."

In operation, using the type I decoder for a rate ½ code for the example, the values of the parity checks S are stored in the shift register 400, one new parity check being added each shift of the decoder. Once every shift of the decoder the entire contents of the S register are circulated along recirculation line 401 by recirculation gate 402. A clock 403 furnishes timing pulses for the recirculation timing. By counting these clock pulses in an event counter 405, it can be determined when the particular parity checks that are to be used in the decision (e.g., $S_1$, $S_2+S_9$, $S_7$ and $S_{11}$ for FIG. 1) have arrived at the end of the parity check register 400. The event matrix 407 selects such parity checks. Those parity checks which are themselves subsolution signals (e.g., $S_1$, $S_7$ and $S_{11}$ for FIG. 1) are clocked directly into the threshold counter 409 along line 413. Those parity checks which enter first into a modulo two addition to form a composite subsolution signal ($S_3$ and $S_9$ for FIG. 1) are clocked into a scale-of-two counter stage 411 which will finally indicate an odd or even number of ones among such parity checks, giving the value of the composite subsolution signal. At the first open time after the last constituent of the composite subsolution signal has arrived at 411, the modulo 2 sum is also clocked by line 417 into the threshold counter 409. More than one scale-of-two stage may be used if more than one composite subsolution signal is to be prepared during overlapping times.

The threshold counter is read out most conveniently by pre-storing in it a number, depending on the particular code then being employed, which will just make the counter fill up when half the maximum number of pulses are entered. One more pulse will then make the last stage turn back to zero for the first time; this single event is used to indicate a majority decision that the solution signal is a "one."

Such schemes as this, in which the entire parity check memory is recirculated during a single shift of the decoder, are particularly suited to decoders in which the parity check register is in the form of a delay line rather than the more usual digital shift stages; but may be used with either advantageously. If different weights are to be attached to the subsolution signals, a corresponding number of pulses may be generated at the times as each such subsolution signal is applied to the counter. If a shift register is used as the parity check memory, this may be conveniently accomplished by interrupting the shift pulse train while an appropriate number of counts is entered (or not, if the value is zero). Otherwise, a timed gate may admit a varying number of pulses from a faster master clock. In either case the threshold value is adjusted to one more than half the maximum number of such pulses for simple majority decoding.

Counting threshold devices are not restricted to recirculation memories, but are well suited to them, especially since access to only one point in the memory is required.

New data is entered into the register at the end of the circulation cycle by so proportioning the timing that for a memory of length $N/2$, there are $N/2+1$ advances during a shift of the decoder. The last advance is used to accept the new S value into the leading end of the memory, while the matrix breaks the recirculation loop and thereby discards the oldest S value.

FURTHER EXAMPLES OF DECODING CONVOLUTIONAL CODES

The invention has been explained above with the example of a two-error correcting systematic code having a constraint length of 12 and an equal number of information and parity signals, and in describing this code a time unit was considered to occur with every information or redundancy signal. From this example it is obvious that the invention applies generally to convolutional codes. Some further examples will now be described.

The known parity check operation of the decoder over a time interval of one constraint length from time "0" is depicted in FIG. 9. Each horizontal $g$ row represents the inputs at one time unit to an adder that forms therefrom a simulated redundancy signal $p_s$. Each $p_s$ is added to the respective received redundancy signal $p_r$ to complete a parity check row S. The vertical "$g$" column on the left represents the entire sequence of $g$ connections between the decoder (or encoder) memory stages and the redundancy bit adder and $i_0$ is shown reaching the first connection at the top of this column, progressing down one row for each time unit until at time $m$ it reaches the last stage $g_m$. The second column of $g$'s headed by $i_{1_r}$ begins one time unit below the first column, and extends only to stage $g_{m-1}$, because $i_1$D, being delayed by one time unit from $i_0$, arrives at connection $g_0$ one time unit after $i_0$, and after $i_0$ has moved to connection $g_1$. As shown in the last column at time unit $m$, $i_{m_r}$ arrives at the input to the adder along connection $g_0$ and the last row of the parity triangle is thus formed.

The usefulness of the parity check triangle in describing the decoder of the invention is illustrated in FIG. 10 by describing the two-error-correcting decoder given above. In the above decoder the $g$ connections equal to "1" between the decoder memory and the redundancy adder were the coder input and the outputs of the third, fourth and fifth memory stages, this corresponding to $g_0$, $g_3$, $g_4$ and $g_5$ under the present notation. In FIG. 1 adder 19 added the information signals $i$ from the chain of shift registers 3', 7', 9' and 11' to form simulated redundancy signals $p_s$. Then adder 14 added these to the corresponding redundancy signals $p_r$ arriving on line 10, to form parity check signal S. In FIG. 10 one can likewise assume at each time unit the information signals in the corresponding row in the triangle are summed to form $p_s$ and added to the corresponding received redundancy signal $p_r$ and the resultant error signal sum stored. It is also apparent that the information and redundancy signals could instead be stored and at one instant all the error signal sums could be formed, but this would require considerably more circuitry.

In FIG. 1 adder 38 combined the contents of stages 9'' and 3'' (containing $S_1$ and $S_4$, respectively, in the present notation) to form a composite subsolution signal.

In FIG. 10 the same composite subsolution signal $S_1+S_4$ is shown by the modulo 2 addition of rows at time units one and four, adding redundancy signals $p_1$ and $p_4$ and the corresponding information signals. FIG. 10 shows that neither row $S_1$ nor row $S_4$ alone satisfies the orthogonal rules with $S_0$, $S_3$ and $S_5$. But by the modulo 2 sum $S_1$ and $S_4$, their errors that are in common with the other S signals add out while $e_0^1$ appears whereby the rules are satisfied. The circles in FIG. 10 show the rows in which the various information error components appear and the slanted lines indicate the error signal has been eliminated by forming the composite subsolution signal.

In the type I decoder of FIGS. 1 and 10, inputs are parity check signals S and the threshold device output is the value of the error component $e_0^1$. This error component is added to $i_{0_r}$ to add out $e_0^1$, to obtain $i_0^*$.

In the type II decoder of FIG. 4 of my U.S. Patent 3,303,333 the decoder decides upon the correct value of $i_0$ directly, which is shown in FIG. 11 by parity triangle diagram. The value of $i_{0_r}$ is added to each type I subsolution signal, thereby adding in $i_0$ and adding out $e_0^1$ so that the subsolution signals become orthogonal upon $i_0$ instead of $e_0^1$, $i_{0_r}$ itself becoming a proper additional input to the threshold device. The rules for forming the codes and the selection of the parity check rows for type I and type II decoders are exactly the same, so only type I decoders will be used for the following examples.

FIG. 12 shows a decoder for a rate ½ code of constraint length 44, the following $g$'s being equal to 1: $g$'s, 0, 11, 13, 16, 17, 19, 20 and 21. The ordinary subsolution signals are $S_0$, $S_{11}$, $S_{13}$, $S_{16}$ and $S_{17}$. The composite subsolution signals are the modulo 2 sums $$S_2+S_3+S_6+S_{19}$$

$S_4+S_{14}+S_{20}$; and $S_1+S_5+S_8+S_{15}+S_{21}$. This is an example of an important group of codes that has been discovered which has near maximum theoretical efficiency: the first $g$ connection, $g_0$, is 1, then there follows a group of $g$ connections numbering about one half the total number of $g$'s in which the $g$'s are all equal to 0, e.g., $g_1$ through $g_{10}$ are "0." By this a large number of horizontal rows are provided at the top of the triangle that each contains only one error, and each of these errors is different from the other. The values of the lower group of $g$'s are selected to form rows and sums of rows no more than two of which contains any one of the single errors in the upper group. Then rows from the upper group can be added by the decoder to rows of the lower group to add out one instance of the single errors in the lower group, thereby to satisfy the orthogonalization rules.

There follows a table of rate ½ codes with specifications for the decoder orthogonalization circuitry. The column headed "Code $g$'s=1" denotes the $g$ connections that are made in the parity check circuitry of FIG. 10. The superscript 2 indicates that the $g$ connections are used to form the output from the second line of the encoder, there being of course only one redundancy output line in these rate ½ codes. The column entitled "Rules for Orthogonalization" indicates the numbers of the parity check rows that are to serve as subsolution signals, the indication that two or more rows are added together indicating how the composite subsolution signals are formed. The column entitled "J" indicates the total number of subsolution signals that can be formed orthogonal on the error component of $i_{0_r}$ which indicates the error-correcting capability of the code. The column headed "$n_E$" indicates the number of message signals that play a part in the formation of the set of orthogonal subsolution signals and the column headed "$n_A$" indicates the constraint length of the code. The column headed "R" indicates the code rate $k_0/n_0$, and the column headed "$m$" indicates the number of encoder memory stages required.

TABLE I

| Code g's=1 | Rules for Orthogonalization S | J | $n_E$ | $n_A$ | R | $m$ |
|---|---|---|---|---|---|---|
| $(0, 1)^2$ | $0^2, 1^2$ | 2 | 4 | 4 | ½ | 1 |
| $(0, 3, 4, 5)^2$ | $0^2, 3^2, 4^2, 1^2+5^2$ | 4 | 11 | 12 | ½ | 5 |
| $(0, 6, 7, 9,$<br>$10, 11)^2$ | $0^2, 6^2, 7^2, 9^2$<br>$1^2+3^2+10^2, 4^2+8^2+11^2$ | 6 | 22 | 24 | ½ | 11 |
| $(0, 11, 13, 16,$<br>$17, 19, 20, 21)^2$ | $0^2, 11^2, 13^2, 16^2$<br>$17^2, 2^2+3^2+6^2+19^2,$<br>$4^2+14^2+20^2,$<br>$1^2+5^2+8^2+15^2+21^2$ | 8 | 37 | 44 | ½ | 21 |
| $(0, 18, 19, 27,$<br>$28, 29, 30, 32,$<br>$33, 35)^2$ | $0^2, 18^2, 19^2, 27^2,$<br>$1^2+9^2+28^2, 10^2+20^2+29^2,$<br>$11^2+30^2+31^2,$<br>$13^2+21^2+23^2+32^2,$<br>$14^2+33^2+34^2,$<br>$2^2+3^2+16^2+24^2+26^2+35^2$ | 10 | 56 | 72 | ½ | 35 |
| $(0, 26, 27, 39,$<br>$40, 41, 42, 44,$<br>$45, 47, 48, 51)^2$ | $0^2, 26^2, 27^2, 39^2,$<br>$1^2+13^2+40^2, 14^2+28^2+41^2,$<br>$15^2+42^2+43^2,$<br>$17^2+29^2+31^2+44^2,$<br>$18^2+45^2+46^2,$<br>$2^2+3^2+20^2+32^2+34^2+47^2,$<br>$21^2+35^2+48^2+49^2+50^2,$<br>$24^2+30^2+33^2+36^2+38^2+51^2$ | 12 | 79 | 104 | ½ | 51 |

The effectiveness of the use of composite subsolution signals can be appreciated by comparing the foregoing table with a table of self-orthogonal codes for the rate one half, a self-orthogonal code being defined as one in which all the parity checks S that contain $i_{0_r}$ form an orthogonal set of subsolution signals. Note, for instance, that to obtain $J=12$ an encoder memory of only 51 is required using composite subsolution signals, but an encoder memory of 118 is required for a self-orthogonal code, a great difference in terms of memory stages required for the encoding and decoding equipment.

TABLE II

| Code g's=1 | J | $n_E$ | $n_A$ | R | $m$ |
|---|---|---|---|---|---|
| $0^2, 1^2$ | 2 | 4 | 4 | ½ | 1 |
| $0^2, 1^2, 3^2, 7^2$ | 4 | 11 | 16 | ½ | 7 |
| $0^2, 1^2, 3^2, 7^2, 12^2, 20^2$ | 6 | 22 | 42 | ½ | 20 |
| $0^2, 1^2, 3^2, 7^2, 12^2, 20^2$<br>$30^2, 44^2$ | 8 | 37 | 90 | ½ | 44 |
| $0^2, 1^2, 3^2, 7^2, 12^2, 20^2$<br>$30^2, 44^2, 65^2, 80^2$ | 10 | 56 | 162 | ½ | 80 |
| $0^2, 1^2, 3^2, 7^2, 12^2, 20^2$<br>$30^2, 44^2, 65^2, 80^2, 96^2, 118^2$ | 12 | 79 | 238 | ½ | 118 |
| $0^2, 1^2, 3^2, 7^2, 12^2, 20^2$<br>$30^2, 44^2, 65^2, 80^2, 96^2,$<br>$118^2, 143^2, 177^2$ | 14 | 106 | 356 | ½ | 177 |

The self-orthogonal codes just given define an even number J of subsolution signals. Similarly, codes for odd numbers J can be formed. FIG. 13 is an example of the $J=5$ self-orthogonal code in which the following $g$'s are ones: $g_0$, $g_1$, $g_3$, $g_7$, $g_{12}$; and the subsolution signals for the threshold device are $S_0$, $S_1$, $S_3$, $S_7$ and $S_{12}$.

Threshold decoding is not limited to code rates ½ but applies generally to the coding rate $k_0/n_0$. In the $1/n_0$ instance, the parity check triangles are represented by FIG. 14. Here line 1 of the output of the encoder is the stream of information bits, and the remaining $n_0-1$ output lines are the streams of redundancy bits, each being computed by a different polynomial G, that is each output line has a different parity triangle. The superscripts 2, 3 . . . $n_0$ indicate the appropriate output lines.

FIG. 15 illustrates the type I decoding circuitry applied to a rate ⅓, constraint length 24 code. Parity check rows from the two parity triangles are added together to form the composite subsolution signals as is shown, $S_1^3+S_3^3$, $S_2^2+S_4^3$ and $S_2^3+S_5^2+S_6^2+S_6^3$.

There follows a table of $1/n_0$ rate convolutional codes, using the nomenclature of the tables above, with the superscripts in the "code" column representing the redundancy bit lines to which the $g$ assignment appertains. For instance, $(0)^2$ means that $g_0$ is "1" for the number 2 output line of the encoder, the first redundancy bit line. The superscripts in the "Rules" column denote the parity triangles from which the indicated rows are to be taken, e.g., $0^2$ means the "0th" parity check row of the parity triangle for output line 2.

TABLE III

| Code g's=1 | Rules for Orthogonalization | J | $n_E$ | $n_A$ | R | $m$ |
|---|---|---|---|---|---|---|
| $(0)^2(0)^3$ | $0^2, 0^3$ | 2 | 3 | 3 | ⅓ | 0 |
| $(0, 1)^2(0, 2)^3$ | $0^2, 0^3, 1^2, 2^3$ | 4 | 7 | 9 | ⅓ | 2 |
| $(0, 1)^2$<br>$(0, 2, 3, 4)^2$ | $0^2, 0^3, 1^2, 2^3,$<br>$1^3+3^3, 2^2+4^3$ | 6 | 13 | 15 | ⅓ | 4 |
| $(0, 1, 7)^2$<br>$(0, 2, 3, 4, 6)^3$ | $0^2, 0^3, 1^2, 2^3,$<br>$1^3+3^3, 2^2+4^3, 7^2$<br>$3^2+5^2+6^2+6^3$ | 8 | 20 | 24 | ⅓ | 7 |
| $(0, 1, 9)^2$<br>$(0, 1, 2, 3,$<br>$5, 8, 9)^3$ | $0^2, 0^3, 1^2, 2^2+2^3,$<br>$9^2, 3^3+4^3, 3^2+5^2+5^3,$<br>$1^3+4^2+6^2+6^3,$<br>$8^2+8^3, 7^3+9^3+10^3$ | 10 | 30 | 33 | ⅓ | 9 |
| $(0, 4, 5, 6, 7,$<br>$9, 12, 13, 16)^2$<br>$(0, 1, 14, 15, 16)^3$ | $0^2, 0^3, 1^2+1^3, 4^2,$<br>$5^2, 2^3+6^2, 14^3,$<br>$7^2+10^2+11^2+11^3,$<br>$3^3+5^3+9^2, 6^3+8^3+12^2,$<br>$3^3+16^3+17^3,$<br>$4^3+10^3+12^3+16^2$ | 12 | 40 | 54 | ⅓ | 16 |
| $(0, 4, 5, 6, 7, 9,$<br>$12, 13, 16, 19,$<br>$20, 21)^2$<br>$(0, 1, 20, 22)^3$ | $0^2, 0^3, 1^2+1^3, 4^2,$<br>$5^2, 2^3+6^2,$<br>$7^2+10^2+11^2+11^3,$<br>$3^3+5^3+9^2, 19^3+20^3,$<br>$22^3, 6^3+8^3+12^2,$<br>$4^3+10^3+12^3+16^2,$<br>$3^2+7^3+13^3+15^3+19^2,$<br>$9^3+13^2+14^3+18^2+$<br>$20^2+21^2+21^3$ | 14 | 55 | 69 | ⅓ | 22 |
| $(0, 4, 5, 6, 7,$<br>$9, 12, 16, 17,$<br>$30, 31)^2$<br>$(0, 1, 22,$<br>$25, 35)^3$ | $0^2, 0^3, 1^2+1^3, 4^2$<br>$5^2, 2^3+6^2, 22^3,$<br>$7^2+10^2+11^3+11^2,$<br>$3^2+25^3, 3^3+5^3+9^2,$<br>$6^3+8^3+12^2,$<br>$7^3+14^2+17^2+18^2+18^3,$<br>$9^3+16^2+19^2+20^2+20^3,$<br>$14^3+15^3+35^3,$<br>$12^3+21^3+28^2+31^2+32^2,$<br>$10^3+13^3+19^3+26^3+29^3+30^2$ | 16 | 68 | 108 | ⅓ | 35 |
| $(0)^2(0)^3(0)^4(0)^5$ | $0^2, 0^3, 0^4, 0^5$ | 4 | 5 | 5 | ⅕ | 0 |
| Add $(1)^2(1)^3$ | $1^2+1^4, 1^3+1^5$ | 6 | 9 | 10 | ⅕ | 1 |
| Add $(2)^2(2)^4$ | $2^2+2^3, 2^4+2^5$ | 8 | 13 | 15 | ⅕ | 2 |
| Add $(3)^2(3)^5$ | $3^5, 3^2+3^3$ | 10 | 18 | 20 | ⅕ | 3 |
| Add $(4)^2(5)^4(5)^5$ | $3^4+4^2+4^4, 5^5, 4^3+5_3+5^4$ | 13 | 27 | 30 | ⅕ | 5 |
| Add $(6)^4$ | $4^5+6^4$ | 14 | 30 | 35 | ⅕ | 6 |
| Add $(8)^3(7)^4$ | $8^3, 5^2+6^3+7^2+7^4$ | 16 | 37 | 45 | ⅕ | 8 |
| $(0, 1, 2, 3, 5, 6,$<br>$8, 10)^2(0, 3, 5,$<br>$6, 8)^3(0, 1)^4$<br>$(0, 2, 10)^5$ | $0^2, 0^3, 0^4, 0^5,$<br>$1^2, 2^2+2^4, 3^3, 1^4+1^5,$<br>$2^3+2^5, 3^2+4^2, 3^4+5^5+5^4,$<br>$9^4+10^2+10^3, 5^3, 3^5+6^3,$<br>$10^5, 1^3+4^4+6^2+6^4,$<br>$7^2+7^4+8^2+9^2,$<br>$4^3+5^5+7^3+8^3+8^4$ | 18 | 47 | 55 | ⅕ | 10 |
| Add $(10)^4(12)^3$ | $6^5+9^5+12^3,$<br>$10^4+11^5+12^4+12^5$ | 20 | 55 | 65 | ⅕ | 12 |
| Add $(11, 13, 14)^2$<br>$(15)^5$ | $4^5+13^4+14^2+14^3,$<br>$13^5+14^4+15^4+15^5$ | 22 | 65 | 80 | ⅕ | 15 |
| $(0)^2(0)^3(0)^4$<br>$(0)^5(0)^6(0)^7$<br>$(0)^8(0)^9(0)^{10}$ | $0^2, 0^3, 0^4,$<br>$0^5, 0^6, 0^7$<br>$0^8, 0^9, 0^{10}$ | 9 | 10 | 10 | ⅒ | 0 |
| Add $(1)^6(1)^7$<br>$(1)^8(1)^9(1)^{10}$ | $1^2+1^6+1^3+1^7$<br>$1^4+1^8, 1^6+1^9, 1^{10}$ | 14 | 20 | 20 | ⅒ | 1 |
| Add $(2)^2(2)^3$<br>$(2)^6(2)^9$ | $2^2, 2^3+2^4,$<br>$2^6+2^7, 2^8+2^9$ | 18 | 28 | 30 | ⅒ | 2 |
| Add $(3)^2(3)^4$<br>$(3)^8(3)^9(3)^{10}$ | $3^2+3^3, 3^4, 3^7+3^8$<br>$3^6+3^9, 2^5+3^5+3^{10}$ | 23 | 39 | 40 | ⅒ | 3 |
| Add $(4)^2(4)^8(4)^9$ | $4^8+4^{10}, 2^{10}+4^2,$<br>$4^3+4^4+4^7+4^9$ | 26 | 48 | 50 | ⅒ | 4 |
| Add $(6)^2(5)^5$<br>$(5, 6)^6(5, 6)^9$<br>$(6)^{10}$ | $5^5, 4^6+5^4+5^6,$<br>$4^5+5^2+5^9, 5^7+6^5+6^6,$<br>$5^8+6^4+6^9, 5^3+6^{10},$<br>$6^2+6^3+6^7+6^8$ | 33 | 69 | 70 | ⅒ | 6 |
| Add $(7)^6(7, 8)^9$<br>$(8)^7(8)^8$ | $5^{10}+7^6+7^{10}, 8^7$<br>$7^2+7^5+7^7+7^9,$<br>$7^3+7^4+8^5+8^9,$<br>$7^8+8^3+8^4+8^5+8^8$ | 38 | 88 | 90 | ⅒ | 8 |

NOTE.—"Add" means the code and rules for orthogonilization are the same as for the preceding code with the additions given.

The code rate numerator $k_0$ can be varied as well as the denominator $n_0$. Referring to FIG. 16, in the first parity triangle, G, $g_0$ and $g_1$ are equal to one, in the second parity triangle H, $h_0$ and $h_2$ are equal to one. At the encoder the sum $g_0i_0^1+h_0i_0^2$ forms the only redundancy bit for time zero $p_0^3$, $p_1^3=g_1i_0^1+g_0i_1^1+h_0i_1^2$ and $p_2^3=g_1i_1^1+g_0i_2^1+h_0i_2^2+h_2i_0^2$. At the decoder information bits $i_0^1$, $i_1^1$ and $i_2^1$ on the first information line are input to the G parity triangle and information signals $i_0^2$, $i_1^2$ and $i_2^2$ on the second information line are input to the H parity triangle. The simulated redundancy bits are formed as the sum of the corresponding rows of the two parity triangles and are added to the redundancy signals $p_r$ of the same time unit to form parity checks S. It will be seen that $S_0$ and $S_1$ define a set of subsolution signals orthogonal upon $e_0{}^i1$ while $S_0$ and $S_2$ define a set of two subsolution signals orthogonal on $e_0{}^i2$. Applying these two sets of subsolution signals, one set to each of two threshold devices, the value of $e_0{}^i1$ and $e_0{}^i2$ can be computed and the correct value of $i_0^1$ and $i_0^2$ obtained.

In the case of a rate ⅗ code, three information lines would share two redundancy lines in exactly the same way two information lines share one redundancy line in rate ⅔, though with more complex circuitry due to the need for multiple parity check equations.

The generalization of the parity triangles to apply to all types of $k_0/m_0$ convolutional codes is shown in FIG. 17.

While systematic codes are most preferred wherein the information signals appear directly, it will be apparent that since for each systematic code an equivalent nonsystematic code exists from which the uncombined information signals can be computed at the decoder, then it is apparent that the invention applies to nonsystematic linear codes. Also, while the binary system is employed for illustration, any number field can be employed.

A prime advantage of the invention applied to convolutional codes is the simplicity and low cost of the terminal equipment needed for a given error detection or correction capability. Only the number $n_A-n_0$ stages of memory are required using either the type I or type II decoder, regardless of the rate, which appears to be the theoretical minimum of storage stages required to decode any convolutional codes. Not only does this achieve great savings in cost of equipment for a single code, but also, by simple switching, a decoder having a given memory can be adapted to handle all systematic codes of the same or shorter constraint lengths, regardless of the code rate. A fixed amount of computation is required to decode each signal which enables the use of simple decoding circuitry, and this circuitry need only operate at the frequency of the time units, even though a multiplicity of information and redundancy signals arrives each time unit, which enables the use of relatively low speed components.

The clock unit or time interval referred to in this specification is used for the purpose of denoting the interval during which one or a set of inputs are received and outputs are emitted by the encoder. While there are numerous instances where the clock unit will be measured by strict real time, this is not necessary. For instance, the first time or clock unit might be one second and the second unit might be one minute. This would not affect the decoder solution so long as the decoder is shifted only as the signals arrive. A variable clock decoder may be of advantage with teletypewriters, for instance, in which seven signals are usually emitted, the first and the last signals being 1½ times as long as the intermediate 5. The first and the last signals are start and stop pulses for the teletypewriter. The other five signals carry information, and these are what would be encoded or decoded. The encoder and decoder would disregard the start and stop pulses so there would be gaps in the real time scale, and each clock unit would be the time required for receiving one of the data pulses.

BACKWARD-FORWARD DECODING

Decoding of encoded digital messages that have been communicated by radio or wire is ordinarily performed adequately by proceeding in sequence from the initial information signal (i.e., in the "forward" direction).

According to the invention it has been realized, however, that in decoding from a magnetic tape where the tape must sometimes be moved forward and sometimes backward to find the encoded message or in decoding data that has been stored in other storage media an important saving in rewind time can be achieved if the message is decoded in reverse sequence or "backwards" from the tape when the message is found ahead of the decoder or an important savings in access time can be achieved if only a small portion of the data near one end of the data block is needed. It has further been realized that such backward decoding of systematic convolutional codes can be possible by modifying the encoder and decoder apparatus to make the devices that form the redundancy signals reciprocal, ordinarily at the expense of adding some extra stages to the memory of these devices, and, as needed, introducing delay to achieve the same synchronization between the information signals and redundancy signals when proceeding backward as is obtained when proceeding forward. It still remains possible for the information redundancy signals to be serialized, i.e. interleaved in a single digital stream, as is ordinarily desired.

In the case of convolutional codes every redundancy signal forming device, or, equivalently, the code generating polynomial that defines the structure of such devices (see Equation 14 above), can be made reciprocal, it being necessary only to increase the length of the memory and to add additional $g=1$ connections thereto so that every $g=1$ connection that is spaced to the left of the center of the memory has a mating $g=1$ spaced the same number of units to the right. From this it is apparent that to be made reciprocal no more than $m$ additional memory stages are needed to make any redundancy signal forming device reciprocal. Actually, many efficient codes will be found where only a few extra memory stages will be required.

For an example the redundancy signal forming device described in conjunction with FIG. 1, using the $k_0/n_0$ time notation, is $g$'s 0, 3, 4 and 5 equal to 1, five memory stages being therefore required to generate the redundancy signals.

Referring to FIG. 18, this decoder is made reciprocal by adding only three memory stages 7*a*, 5*a*, 3*a* and one further $g=1$ connection so that $g$'s 0, 3, 4, 5, 8=1, $g_4$ being the center. It will be recalled in the FIG. 1 code the redundancy signals followed the information signals, the decoder being adapted for that. To decode the message backwards, it is necessary to provide delay device 21*a* at the decoder redundancy input line 17*a* for decoding backward so that the final redundancy signal (the first one to reach the decoder when decoding backward) will immediately follow the final information signal.

It should be noted that the last redundancy signal can contain a signal affected only by the final information signal through $g_8$ simply by causing a stream of zeros to enter the encoder at the end of the message, and operating the encoder until the last information signal has entirely traversed it.

Operating in either direction decoding of each information signal is carried out by parity checks formed from using the first six redundancy signals to arrive at the decoder. At the decoder the error in the information signal, if any, is added out by reset line 40*a* through single unit delay 21″ before reaching final stage 3*a* (as could also be done in the case of random supplementation to eliminate the A′ register, see FIG. 3) so it is not present on the input $g_8'$ to the parity checks.

It will be apparent that while the aspect of the invention is very efficiently instrumented by the threshold decoder of this invention, it is not limited thereto, but can be employed with any decoder that operates on a convolutional code.

APPLICABILITY OF THRESHOLD DECODING TO BLOCK LINEAR CODES

This class of codes is distinguished from convolutional codes in that each set of $k$ information symbols is independently encoded into a block or code word of $n$ symbols ($n>k$) for transmission and each block is decoded with no dependence upon any other block. All theoretically possible code words ordinarily are not employed, but rather a set is selected for the valid code words, these being as different as possible from each other so that they can be distinguished even when errors are present in received code words.

The invention advantageously employs block codes in systematic form, denoted by $(n, k)$, the $k$ information signals $i$ appearing unchanged in the $n$ output signals of the encoder and the $n-k$ redundancy signals $p$ being modulo 2 sums of information signals, similar to the convolutional codes. The parity check matrix for $(n, k)$ codes is shown in FIG. 19.

The basic theory of operation of the invention as applied to block codes is the same as for convolutional codes. After being subjected to error conditions, the message signals are denoted by $i_r$ and $p_r$, and each can be considered to be the modulo 2 sum of a message component, $i$ or $p$, and an error component $e^i$ or $e^p$. At the decoder a replica of the encoder or an equivalent circuit which performs the encoding operation can be employed to form a simulated redundancy signal $p_s$ from the received information signals. By adding the received and simulated redundancy signals $p_r$ and $p_s$, the message components add out leaving a sum of errors and if every information component is added out, this sum is called a parity check and denoted by the letter S. In FIG. 19 the information signals are shown at the top of columns of the parity check matrix and each horizontal row of C's represents a redundancy signal. The columns of C's denote connections which may be "0" or "1" to the modulo 2 adder when forming the respective redundancy signal. Thus, in the first column if $i_1$ is to be a component of the second redundancy signal $p_{k+2}$, then $c_{k+2_1}$ must be equal to one. This standard block code matrix diagram is different from the convolutional code matrix in that the information signals are not to be considered to progress down the columns of the matrix according to a delay pattern, but rather each is to reside in each $c$ position of the respective column simultaneously.

Like the convolutional codes, block codes that are cyclic can be decoded on a sequential basis. A cyclic code is a linear code for which the sequence formed by placing the first digit of a code word in the second position, the second digit in the third position, and so on with the last digit of the code word in the first position also is a valid code word. For example, referring to FIG. 20, an encoder and decoder similar to that in FIG. 1 is shown for a (7, 3) so-called maximal-length cyclic code having the parity check matrix as shown. At the encoder an information block generator 300 is connected to input line 301 and the series $k$ of information bits $i_1$, $i_2$ and $i_3$ are sequentially applied to a chain of three shift registers 303, 305 and 307. A modulo 2 adder 319 has as inputs lines $c_1$ connected to the output of stage 307 and $c_2$ connected to the output of stage 305. The output of the adder 319 is connected by line F to the input of stage 303. A switching means 313 is adapted to close and open line F, to close line F for each block only during four time intervals beginning when information signal $i_1$ reaches connection $c_1$. The coding rule is, beginning at time one, a block of seven $(n)$ successive signals is output from stage 307 and transmitted as an encoded message block. The first redundancy signal $p_4$, following in time the three information signals, will comprise the digital sum $[i_1+i_2]$ computed by adder 319 and applied as the input to stage 303 at time 1. Redundancy signal $p_5$ will equal $[i_2+i_3]$; $p_6$ will equal $[i_3+p_4]$ which is the same as $[i_1+i_2+i_3]$; and $p_7$ will equal $[p_4+p_5]$ in which $i_2$ appears twice and adds out so that $p_7$ equals $[i_1+i_3]$.

After exposure to error conditions the received block is fed directly along line 318 into the parity check generator which comprises storage stages 303″, 305″, 307″, 309″, and modulo 2 adders 320, 322 and 324. The adders add to the progressing signals the output of stage 309″ from feedback line 340″. At the time instant when $p_7$ enters adder 320, for instance, the sum $i_{1_r}+i_{3_r}$ is also input to this adder 320 because of the feedback connection 340. Hence $p_{7_r}i_{1_r}+i_{3_r}$ is then stored in 303″ and this is $S_7$, the sum of $p_{7_r}$ and the simulated redundancy signal $[i_{1_r}+i_{3_r}]$. Similarly it can be seen that at this same instant $S_6$ is completed and stored in 305″, $S_5$ in 304″ and $S_4$ in 309″ as shown on FIG. 20 due to the selection of the feedback inputs which form the simulated redundancy signals and add them directly to the received redundancy signals as the latter progress through the shift register.

Threshold device 336 receives a set of orthogonal subsolution signal inputs, adds the inputs by ordinary arithmetic, compares the real number sum to a threshold value, and generates a solution signal for the value of the error component upon which the set is orthogonalized. To this end output 330 from stage 309″ and output 334 from stage 303″ are each input to the threshold device, and outputs 328 and 332 from stages 307″ and 305″, respectively, are combined by binary adder 338 to form a composite subsolution signal which is applied through connection 339 to the threshold device, thus defining a set of three subsolution signal inputs. The decoder is ready to produce solutions after the entire block has passed line 318, for at that time which can be designated time unit one, parity check $S_4$ has been formed in stage 309″ and parity check $S_7$ has been formed in stage 303″. Until this time, a switch means 341 disables the threshold device from emitting signals. At time unit one inputs to the threshold device 336 are $S_7$, $(S_6+S_5)$ and $S_4$. By examination of the parity check matrix, it is seen that these three (J) signals are orthogonal upon $e_1$, the error component of $i_{1_r}$. The threshold device 336 adds the inputs and compares the sum to the threshold value to render a solution for $e_1$* (*denoting decoding estimate). How $e_2$ and $e_3$ are determined will be described in the second following paragraph. The threshold value can be computed by the same laws as apply to the FIG. 1 decoder, e.g. decide $e_1=0$ if $J/2$ or more parity checks are "0," decide $e_1=1$, if more than $J/2$ parity checks are ones, or weighting can be employed, either fixed or time varying weights, each subsolution signal being weighted by a probability value, e.g., weight $$W_m=2\log\frac{q_m}{p_m}$$

where $p_m=1-q_m$ is the probability that the message signals constituting the S input, exclusive of $e_1$, contain an odd number of errors, and the threshold value is set at $$1/2\sum W_{m_{1\text{ to }J}}\text{ plus }\log\frac{1-p_0}{p_0}$$

where $p_0$ is the probability of error in the signal being decoded.

To produce the decoded value of $i$, the decoder employs a buffer for the information signals $i_r$ adapted to emit them in synchronization with the solutions for their error signals. This comprises a delay device 380 adapted to receive the signals from the block proceeding on line 317 and to delay and emit the sequence of information signals $i_{1_r}$, $i_{2_r}$ and $i_{3_r}$ beginning with $i_{1_r}$ at time one. Storage register 381 is part of delay device 380 but is shown separately for clarity. Threshold output line 341 and buffer output line 382 are inputs to adder 327 which adds out the error components from the sequence of signals and generates a sequence of decoded information components.

For determining $e_2$* and $e_3$* the input $S_1$ at stage 309″ is fed along feedback line 340″ to adders 320, 322 and 324. At time unit two the contents of the shift registers, thus modified, are shifted to the right one unit so that $S_5$ resides in stage 309″, $(S_6+S_4)$ in stage 307″,

$(S_7+S_4)$ in stage 305″, and $S_4$ in stage 303″. Accordingly, at time unit 2 the inputs to the threshold device are $S_4$, $(S_7+S_6)$, since $S_4$ is aded out by adder 338, and $S_5$. From the parity check matrix this set of subsolution signals is seen to be orthogonal upon $e_2$ and the threshold device generates along line 340 the solution $e_2$* which is added with $i_{2_r}$ by adder 327 to obtain $i_2$*. Similarly, at time three the inputs are $S_5$, $S_7$ and $(S_6+S_4)$, orthogonal upon $e_3$, the threshold device generates the estimated value of $e_3$* which is added to $i_{3_r}$ to obtain $i_3$*.

If desired, and as is already known to the art, in feedback line 340 an adder 342 shown in dots can sequentially add to that line the decoded estimates of the error components. By applying this sequence to each of the stages which contains a parity check that has that error signal as a constituent, this error is added out from the parity check. At the end of seven decoding operations all correctable errors will have been added out of the shift register system and since parity checks are always equal to zero in the absence of error, the entire shift register chain should be blanked. Ones occurring in the shift register after the block is decoded are a signal that the block was incorrectly decoded, probably because more errors occurred than the decoding procedure can handle.

The type of decoder exampled by FIG. 20 is referred to as the type I cyclic decoder because of the great similarity to the type I decoder shown in FIG. 1 above. From a comparison, it will be apparent that convolutional codes and cyclic block codes can be decoded with the same apparatus with minor switching, an important advantage of versatility.

The type I cyclic decoder can be used with all cyclic codes that can be completely orthogonalized. "Complete orthogonalization" refers to obtaining the proper number of subsolution signals for each information signal in the block code.

Every block code is said to have minimum distance D if D is the fewest number of positions in which two valid code words have different symbols. It is said that such a code can be completely orthogonalized if $D-1$ subsolutions orthogonal on the error component of each received information signal can be formed, or equivalently if D subsolutions orthogonal on the information component of each received information signal can be formed. If the code can be completely orthogonalized, then any combination of $$\frac{D-1}{2}$$

or fewer errors in a block can always be corrected by threshold decoding. This is the maximum number of errors that the code is capable of correcting over all possible error patterns, as is well known in coding theory. The code in the example of FIG. 28 has minimum distance 4 and hence can be completely orthogonalized since 3 subsolutions orthogonal on the error components of $i_{1_r}$, $i_{2_r}$ and $i_{3_r}$ can be formed as explained above.

The general sequential decoding of cyclic block codes has already been suggested by Meggitt, J. E. (see Error Correcting Codes and Their Implementation for Data Transmissions Systems, I.R.E. Trans. I.T.–7, 4, 234–244 (1961)). Meggitt's main decision element is specified as a combinatorial element which operates according to rules that require an exceedingly complex circuitry. But the present invention of threshold decoding provides a unique form for the combinatorial element, namely, a threshold logical element, which renders Meggitt's theoretically generally circuit practical. In the parity check register only $n-k$ stages and in the buffer means only $k$ stages are required, so the entire memory of the decoder need be no more than $n$, the number of signals in the block, and only one threshold device is required. Without exception it can be stated that given a cyclic $(n, k)$ binary code that can be completely orthogonalized then any combination of $$\frac{D-1}{2}$$

errors (D being the minimum distance of the code) in a block can be corrected by a decoding circuit containing $n$ stages of shift register and one threshold logical element. For cyclic codes that cannot be completely orthogonalized, the threshold decoding illustrated above can also be employed but the error-correcting capability is proportionately less.

In the light of the teaching of FIGS. 1 and 4 my U.S. Patent 3,303,333, the cyclic decoder can also take the type II form in which the threshold output is the decoded estimate of the information components directly. This is illustrated in FIG. 21 for the code given in FIG. 20. It will be recalled that the subsolution inputs to the threshold device 336′ should be the same as the parity check subsolution inputs to the FIG. 20 decoder minus (or plus) the single received information signal to be decoded. Advantageously, instead of forming the parity check signals S and then subtracting from them that received signal, the various components of the parity checks are added directly leaving out the signal to be decoded. Accordingly, the embodiment of FIG. 21 comprises a shift register chain of length $n$ in which the entire block message sequence appears at time one. Since the example is the (7, 3) code of the matrix given in FIG. 20, the connections to the threshold device are as shown in FIG. 21, producing as inputs for time unit one $(p_{7_r}+i_{3_r})$, $(p_{6_r}+p_{5_r})$, $(p_{4_r}+i_{2_r})$ and $i_{1_r}$; this set can be seen from the parity check matrix to be orthogonal on $i_1$. The contents of the last stage in the shift register, containing $i_{1_r}$ at time unit one, are fed back along line 340‴ to adder 320′ preceding the first stage of the shift register to take advantage of the fact that such a cyclic shift of the code digits still produce a valid code word in a cyclic code, and thus the same circuit is a proper decoder for $i_{2_r}$ at time unit 2, and the register is shifted one stage to the right whereby the code is cycled to produce sequential decoding of the stream of information signals. The rules of decision for the threshold device can be substantially the same as for FIG. 4 my U.S. Patent 3,303,333.

A further example of a cyclic code that is not a uniform or maximal-length code and that can be completely orthogonalized is the Bose-Chauduri code (15, 7), $D=5$. Referring to FIG. 22, the parity check matrix for the code is shown. For this block code, four subsolution signals can be formed. These are applied to the threshold device to determine a decoded estimate of $e_1$* which is added to $i_{1_r}$ to produce the decoded estimate $i_1$*, and also as above, after each solution the parity checks are cyclically advanced one stage in their feedback shift register relative to the connections to the threshold device. This causes the inputs to the threshold device to change with time as shown on FIG. 22. The four inputs at time 2 are orthogonal on $e_2$, the four inputs at time 3 are orthogonal on $e_3$, etc.

An attempt has been made with a computer to design a simple logical decoding circuit for this code without success, Peterson, Error-Correcting Codes, M.I.T. Press and John Wiley, 1961, page 204. Threshold decoding gives a simple logical circuit.

As applied to block codes whether cyclic or noncyclic, the invention is not limited to sequential decoding; rather, decoding can proceed simultaneously for all information signals in a block as illustrated in the simple embodiment of FIG. 23. There, two subsolution signals, parity checks $S_5$ and $S_6$ can be formed orthogonal on $e_1$, a threshold device can estimate the value of $e_1$* which is then added to $i_{1_r}$ to produce $i_1$*. Simultaneously, parity checks $S_4$ and $S_6$ form a set orthogonal upon $e_2$ and $S_4$ and $S_5$ upon $e_3$. Using two further threshold devices 419 and 420, the values of $e_2^*$ and $e_3^*$ can be simultaneously determined. Obviously, this code, even though it is noncyclic could also be used for sequential decoding by a decoder with only one threshold device 402 by indexing the parity checks in the direction of the arrow. At time unit two parity checks $S_4$ and $S_6$ would register with the two input lines 410 and 412 and at time unit three $S_4$ and $S_5$ would register therewith.

Another aspect of the invention is that even though no adequate number of orthogonal subsolution signals can be formed directly from high-rate codes because the errors of the information signals repeat too frequently in the parity checks, threshold decoding is not limited to block codes of low-rate. Nor is it limited to block codes of the cyclical type. According to the invention it was realized that orthogonalization need not be limited to single components of the message, but rather a set of signals can be formed orthogonal upon a sum of these components, a threshold device can decide upon the estimated value of the sum, and through a multiple of threshold stages eventually a set of subsolution signals can be formed orthogonal upon a single component whereby the value of that component can be evaluated. This aspect of the invention is referred to as the step-wise orthogonalization procedure and will be illustrated in the following paragraphs.

As a simple example of step-wise orthogonalization, reference is made to FIG. 24 wherein the matrix for the Hamming (7, 4) $D=3$ cyclic code is shown. Examination of the matrix shows that no two parity checks S can be chosen in which no more than one particular $i_r$ signal is repeated. But according to the invention two can be chosen which have in common a pair only of $i_r$ signals, e.g., both the parity checks $S_6$ and $S_7$ can be orthogonalized on the sum $(e_2+e_3)$ and the set $S_5$ and $S_7$ can be orthogonalized on the sum $(e_3+e_4)$. The threshold devices 430 and 432 can form the estimated values of the sums $(e_2+e_3)^*$ and $(e_3+e_4)^*$, respectively. Each of these sums has in common $e_3$ but no other component in common. Accordingly, they comprise a set of signals orthogonal upon $e_3$ and when input to the threshold device 434, an estimated value of $e_3^*$ is obtained. The estimated value of $e_2^*$ can then be formed by combining with adder 436 the estimated value of $e_3^*$ and the estimated value of $(e_2+e_3)^*$ whereby $e_3$ adds out. Likewise, the value of $e_4^*$ is obtained by adding $e_3^*$ to $(e_3+e_4)^*$. Using threshold device 436, the estimated value of $(e_1+e_3)^*$ can be established to which the estimated value of $e_3^*$ is added to obtain $e_1^*$.

Since two steps were required for the establishment of the estimated value of the error component of a given signal, the code of the example is described as being two-step orthogonalized. In more complex codes three steps and more can equally be employed.

The step-wise method can employ orthogonalization upon the information component according to type II prcedure as well as to the error component according to type I procedure, and it can be used with the APP (a posterior probability) decoding rule for weighting the subsolutions with their probability of containing errors just as can all of the other embodiments that have gone before. The applicability of the step-wise orthogonalization procedure can be demonstrated for many types of codes, some being capable of complete step-wise orthogonalization leading to near maximum theoretical decoding efficiency, and in others the broad concept appears applicable in combination with other decoding procedures for simplifying the complete decoding process. It has already been rigorously proved that all of the Bose-Chauduri codes of a length of 15 or less, excepting the (15, 7) code which has already been shown to be subject to simple orthogonalization, can be orthogonalized by the step-wise procedure in such a way that any combination of $$\frac{D-1}{2}$$

or fewer errors in a block can always be corrected by threshold decoding. The (7, 4) and the (15, 5) $D=7$ codes are two-step orthogonalized and the (15, 11) code is three-step orthogonalized. Also, certain other codes such as all the Reed-Muller block codes [see "A Class of Multiple-Error-Correcting Codes and the Decoding Scheme," I.R.E. Trans., p. IT–4, 38–49, 1954] can be step-wise orthogonalized so that $$\frac{D-1}{2}$$

or fewer errors in a block can always be corrected by threshold decoding. These two types of codes are shown in the last two illustrations to be presented of the step-wise procedure.

Referring to FIG. 25, the parity check matrix of the (15, 5) Bose-Chauduri cyclic code is shown which generates the parity checks $S_6$ through $S_{15}$. These are applied at time one as indicated to the three threshold devices 440, 442 and 444 to generate the decoding estimates of the sums $(e_2+e_3)^*$, $(e_3+e_4)^*$ and $(e_4+e_5)^*$. These threshold device outputs are applied to binary adders as shown. It will be seen from the matrix that the sum $(e_2+e_3)^*+S_{11}$, output 456, responds only to errors $e_{11}$ and $e_1$; the sum $(e_2+e_3)^*+(e_3+e_4)^*+S_8$, output 458, responds only to errors $e_8+e_1$; the sum $(e_2+e_3)^*+(e_4+e_5)^*+S_7$, output 446, responds only to errors $e_7+e_1$; the sum $(e_3+e_4)^*+S_{14}$, output 450, responds only to errors $e_{14}+e_1$; the sum $(e_3+e_4)^*+(e_4+e_5)^*+S_6$, output 452, responds only to errors $e_6+e_1$; and the sum $+(e_4+e_5)^*+S_{10}$, output 454, responds only to errors $e_{10}+e_1$. This set of adder outputs is therefore orthogonal upon $e_1$ and as subsolution singals they are applied to the threshold device 460 which emits the estimated value of $e_1^*$.

Each of the threshold devices may operate, for example, by the decoding rule, the output is "one" if four or more of the inputs are "one," and is "zero" otherwise, thereby to correct three or fewer errors occurring in each block. This being a cyclic code the feedback shift register containing the parity checks may be cycled one increment, without changing the connections to 440, 442, 444 and 460, to generate a solution for $e_2^*$ and so on sequentially throughout the block, or further threshold devices can be employed to decode the entire block at once.

The type II procedure applied to the Bose-Chauduri code of FIG. 25 is shown in FIGS. 26–28. FIG. 26 shows means for establishing the value of the information component $i_1^*$ directly. FIG. 27 shows the threshold device required to form the additional sum $(i_1+i_2)$ and FIG. 28 shows that, instead of cycling the decoder, the use of the outputs $i_1^*$ and $(i_1+i_2)^*$ of FIGS. 26 and 27 and step additions allows every one of the information signals to be evaluated in one time unit.

FIG. 29 illustrates a unique systematic "Reed-Muller" code which can be step-wise orthogonalized. Even though there are only four zeros originally in the matrix, still a correct solution can be always obtained if one error occurs in the block and sometimes if error patterns of a higher number of errors occur. For this embodiment the rule of each threshold decision can be, output "1" when three inputs are "1," output "0" when none or only one of the inputs are "1," "error alarm" if two inputs are "1." This example is given because important improvements are obtained over the normal mode for handling the Reed-Muller codes. These codes can now be decoded directly from systematic form which enables the encoding process to be simplified and enables those stations not having decoding circuits to extract data from the message. The unique use of the parity checks enables the use of fewer steps than in the Reed algorithm; no modification of the received sequences is required as decoding progresses; there are no "if-then" steps, a fixed amount of circuitry being specified for every decoding operation; and the unique specified for every decoding operation; and the unique weighting and a posteriori probability decoding algorithm can be employed.

Further modifications will occur to those skilled in the art and all such are considered to fall within the spirit and scope of the invention as defined in the appended claims.

What is claimed is:

1. An apparatus for sequentially decoding an encoded digital binary message and monitoring the decoding operation, the message having been encoded by a binary convolutional code so that it comprises information signals and redundancy signals sequenced therewith, each redundancy signal formed as the modulo 2 sum of certain information signals selected in accordance with a given coding polynomial, means for sequentially forming parity check signals from the information and redundancy signals as they reach the decoder, a parity check memory means through which said parity check signals are progressed, a decision means responsive to selected stages of said parity check memory means, adapted to sequentially emit solution output signals representing the value of the error components in said sequence of information signals, a feedback means for adding out modulo 2 the value of said solution signals from the stored parity checks and a monitoring device for detecting when the number of errors present in the encoded message exceeds the capability of said decoder, said monitoring device having inputs from the output of said decision means and from as many stages of the parity check memory means as contain a parity check formed only from the information signal being decoded and a single redundancy signal, a counter adapted to count the occurrences of "1" signals in said inputs such that said counter counts ones in the output of said decision means, and ones in said parity check stages after the modulo 2 addition thereto of the feed-back value of the corresponding output of said decision means, whereby a given number of counts over a given time period, dependent upon the capability of the decoder, indicates the capability of the decoder has been exceeded.

2. The decoder of claim 1 wherein said connections to stages of said parity check memory means are adapted to produce each time unit a set of more than two parity check signals orthogonal upon the information signal to be decoded during that time unit, said decision means comprising a threshold device responsive to said set of parity checks to form an ordinary arithmetic sum, compare said sum to a threshold value, and emit a signal when the threshold value is exceeded to indicate that the information signal being decoded was received in error.

3. For use together, an encoder and a decoder for processing a sequence of digital binary information signals according to a binary convolutional code with random supplementation of bits to detect the occurrence of a decoding mistake, the encoder including a memory means having a multiplicity of stages through which the digital data is progressed, a modulo 2 adder means for forming redundancy signals, and at least one set of connections to said modulo 2 adder means from selected stages of said memory means in accordance with a corresponding given coding polynomial, the decoder comprising means for forming a sequence of parity check signals by the combination of each redundancy signal with the corresponding information signals, a parity check storage means through which said parity check signals are progressed, a decision element connected to selected stages of said parity check storage means, adapted for each information signal to produce from the parity checks a decoded estimate of the error component of said information signal, a reset means connected to selected stages of said parity check storage means for adding said error components out of the stored parity checks, and a monitoring means for counting the number of solution signals that are "1," said encoder and decoder adapted to cause random digital signals to enter the decoder whenever the decoder fails to correctly decode an information signal, said encoder memory means having a plurality of additional memory stages located at its end towards which the signals progress, beyond those connections to said memory means that correspond to said coding polynomial, at least one connection between one of said additional memory stages and said modulo 2 adder to add a further information signal component to each redundancy signal being formed and to increase the constraint length of the encoder, said decoder adapted, in forming said parity checks, to add out the further information signals introduced to said redundancy signals, said parity check storage means having a length adapted to store parity checks formed from every redundancy signal within said constraint length, a group of said parity check stages at the beginning of said parity check storage means having no connections to said decision element while said reset means is connected to at least one stage in said group for adding out the error component of the signal being decoded, whereby, when the solution of the decision element is wrong, the value of the parity check in said stage is corrupted and tends to cause the decoder to make further mistakes in a cascading effect as said corrupted parity check signal progresses through said decoder.

4. The apparatus of claim 3 wherein said connections to stages of said parity check memory means are adapted to produce each time unit a set of more than two parity check signals orthogonal upon the information signal to be decoded during that time unit, said decision means comprising a threshold device responsive to said set of parity checks to form an ordinary arithmetic sum, compare said sum to a threshold value, and emit a signal when the threshold value is exceeded to indicate that the information signal being decoded was received in error.

5. An apparatus for decoding an information signal from an encoded digital binary message for an erasure channel wherein if an error clearly occurs in a digital signal it can be designated as an erasure rather than either of the possible binary values, the message having been encoded by a binary code so that it comprises information signals and redundancy signals with which parity check signals can be formed, said decoder comprising means for forming parity check signals from the information and redundancy signals at the decoder, a decision means responsive to a selected plurality of said parity checks to emit a solution signal representing the value of the error component of one of said information signals, an erasure memory means adapted to store binary digital erasure data with respect to the information and redundancy signals, and connections to stages of said erasure memory means corresponding to the information and redundancy signal constituents of the selected parity check signals excepting the information signal being decoded, said selected stages controlling disabling means for disabling each parity check from being input to said decision means when any of said parity checks constituent signals are erasures, and means responsive to at least one of the selected parity checks whose constituents are not erased for controlling the logic of said decision means.

6. In the apparatus of claim 5, a first group of modulo 2 "and" gates each corresponding to one of said selected parity checks, each "and" gate having as inputs the digital erasure data for all of the signals that are constituents of the respective parity check signal excepting the information signal being decoded, the outputs of said modulo 2 "and" gates thereby adapted to indicate which parity checks contain only nonerased constituents.

7. The apparatus of claim 6 wherein means are provided to form said selected parity check signals orthogonal upon the information signal being decoded, a second group of "and" gates each associated with one of said parity checks, each having as one input the corresponding parity check and as a second input the output of the corresponding "and" gate from the first group of "and" gates, the output of each "and" gate from said second group when "1" signifying that the value of its parity check is "1" and that all its constituent signals are nonerased, the output of each "and" gate from said second group connected as inputs to said decision means.

8. The apparatus of claim 7 wherein the number of said selected parity checks is greater than two, said decision means comprises an "or" gate means having as inputs the outputs of said second group of "and" gates, a "1" output of said "or" gate signifying that the information signal being decoded was incorrectly received by said decoder.

9. The apparatus of claim 7 including an "or" gate means having as inputs the outputs of said first group of "and" gates and the digital erasure data for the signal being decoded, a "0" output of said second "or" gate signifying that owing to excessive erasures no valid decoding decision can be made.

10. The apparatus of claim 7 for use where the nonerased information and redundancy signals in the decoder have a possibility of error wherein the decision means comprises a threshold device adapted to form the ordinary arithmetic sum of the values of the nonerased parity check inputs thereto, and compare them to a threshold value that is a function of the number of said nonerased parity check inputs.

11. The apparatus of claim 10 wherein means to form said threshold value comprises an adder means for determining the number of "ones" on the outputs of said first group of "and" gates, and means for establishing a fraction of said number as the threshold value.

12. The apparatus of claim 5 adapted for sequential decoding, comprising an information signal memory means through which said information signals are progressed after being received, a modulo 2 adder means for combining signals from selected stages of said memory means with each redundancy signal to produce a succession of parity checks for use in producing a sequence of solution signals corresponding to the "0" or "1" value of the error components of said information signals, means whenever one of said received information signals appears to be erased to cause a "0" to enter said information signal memory means as the value of said signal, and a modulo 2 adder means adapted to sequentially add said solution signals to the corresponding information signals to produce a sequence of corrected information signals.

References Cited

UNITED STATES PATENTS

| | | | |
|---|---|---|---|
| 2,813,149 | 11/1957 | Cory | 178—23 |
| 3,069,498 | 12/1962 | Frank | 178—69 |
| 3,078,443 | 2/1963 | Rose | 340—146.1 |
| 3,200,374 | 8/1965 | Ballard | 340—146.1 |
| 3,303,333 | 1967 | Massey | 235—153 |

OTHER REFERENCES

Error-Correcting Codes, W. Wesley Peterson, MIT Press, 1961.

ROBERT C. BAILEY, *Primary Examiner.*

I. S. KAUVUKOV, *Assistant Examiner.*

UNITED STATES PATENT OFFICE

CERTIFICATE OF CORRECTION

Patent No. 3,402,393 September 17, 1968

James Lee Massey

It is certified that error appears in the above identified patent and that said Letters Patent are hereby corrected as shown below:

Column 1, line 30, "infromation" should read -- information --. Column 2, line 36, "conections" should read -- connections --. Column 5, line 5, "$g_1$=V" should read -- $g_1$=1 --. Column 6, line 14, "a" should read -- an --. Column 8, line 59, after "at the time of the" insert -- reset to zero, but will tend to keep those errors from --. Column 9, line 17, "composities" should read -- composites --. Column 12, line 60, "$S_2$" should re -- $S_3$ --. Column 15, line 28, "$2^2+3^2+16^2+24^2+26^2+35^2$" should read -- $2^2+3^2+16+24^2+26^2+35^2$ --. Column 16, line 47, "$5^5$" should read -- $5^2$ --. Column 18, line 18, "information redundancy" shou read -- information and redundancy --. Column 19, line 17, "deno by $i_r$ and $p_r$" should read -- denoted $i_r$ and $p_r$ --. Column 20, li line 5, "$p_{7_r}\ i_{1_r}\ +i_{3_r}$" should read -- $p_{7_r}+i_{1_r}+i_{3_r}$ --. Column 21, line 3, "aded" should read -- added --. Column 22, line 40, "produce" should read -- produces --. Column 24, line 57, "$(i_1+{}^{i}2)$" should read -- $(i_1+i_2)$ --. Column 25, line 5, cancel "unique specified for every decoding operation; and the".

Signed and sealed this 12th day of May 1970.

(SEAL)
Attest:

EDWARD M.FLETCHER,JR.
Attesting Officer

WILLIAM E. SCHUYLER, J
Commissioner of Patent